United States Patent
Kress et al.

(10) Patent No.: US 11,874,476 B1
(45) Date of Patent: Jan. 16, 2024

(54) METALENS COLLIMATORS AND CONDENSERS

(71) Applicant: Imagia, Inc., Las Vegas, NV (US)

(72) Inventors: Gregory Kress, Las Vegas, NV (US);
Abdoulaye Ndao, Brookline, MA (US);
Erik Shipton, Kirkland, WA (US)

(73) Assignee: Imagia, Inc., Las Vegas, NV (US)

( * ) Notice: Subject to any disclaimer, the term of this patent is extended or adjusted under 35 U.S.C. 154(b) by 0 days.

(21) Appl. No.: 18/451,031

(22) Filed: Aug. 16, 2023

Related U.S. Application Data

(60) Provisional application No. 63/371,608, filed on Aug. 16, 2022.

(51) Int. Cl.
*G02B 27/30* (2006.01)
*G02B 1/00* (2006.01)

(52) U.S. Cl.
CPC .............. *G02B 27/30* (2013.01); *G02B 1/002* (2013.01)

(58) Field of Classification Search
CPC ................................ G02B 27/30; G02B 1/002
USPC ......................................................... 359/641
See application file for complete search history.

(56) References Cited

U.S. PATENT DOCUMENTS

| 10,979,635 | B2* | 4/2021 | Hu | H04N 23/698 |
| 11,029,529 | B2* | 6/2021 | Chou | G02B 27/60 |
| 2018/0045953 | A1* | 2/2018 | Fan | G02B 1/002 |
| 2018/0157058 | A1* | 6/2018 | Chou | G02B 27/60 |
| 2020/0259307 | A1* | 8/2020 | Sharma | H01S 5/3432 |
| 2021/0044748 | A1* | 2/2021 | Hu | G02B 1/002 |
| 2021/0306564 | A1* | 9/2021 | Hu | G02B 1/002 |
| 2022/0385042 | A1* | 12/2022 | Devlin | G02B 19/0057 |
| 2023/0081415 | A1* | 3/2023 | Hsu | G02B 1/002 |
| | | | | 359/811 |

* cited by examiner

*Primary Examiner* — William R Alexander
(74) *Attorney, Agent, or Firm* — PCFB, LLC; Justin K. Flanagan

(57) ABSTRACT

According to various embodiments, a device may include a light-emitting diode (LED) to generate optical radiation at an operational wavelength with a divergent emission profile, such as a Lambertian emission profile, relative to a planar face thereof. A metalens may be positioned to modify the divergent emission profile of the optical radiation from the LED to have a modified transmission profile. The metalens may comprise, for example, a substrate and a two-dimensional array of passive pillars that extend from the substrate with a radially symmetric pattern of varying pillar diameters. The pillars may be spaced from one another according to a uniform subwavelength interelement spacing. The diameters of the pillars are selected as a function of the operational wavelength to provide a target phase gradient that modifies the divergent emission profile of the optical radiation from the LED to have the modified transmission profile.

48 Claims, 33 Drawing Sheets

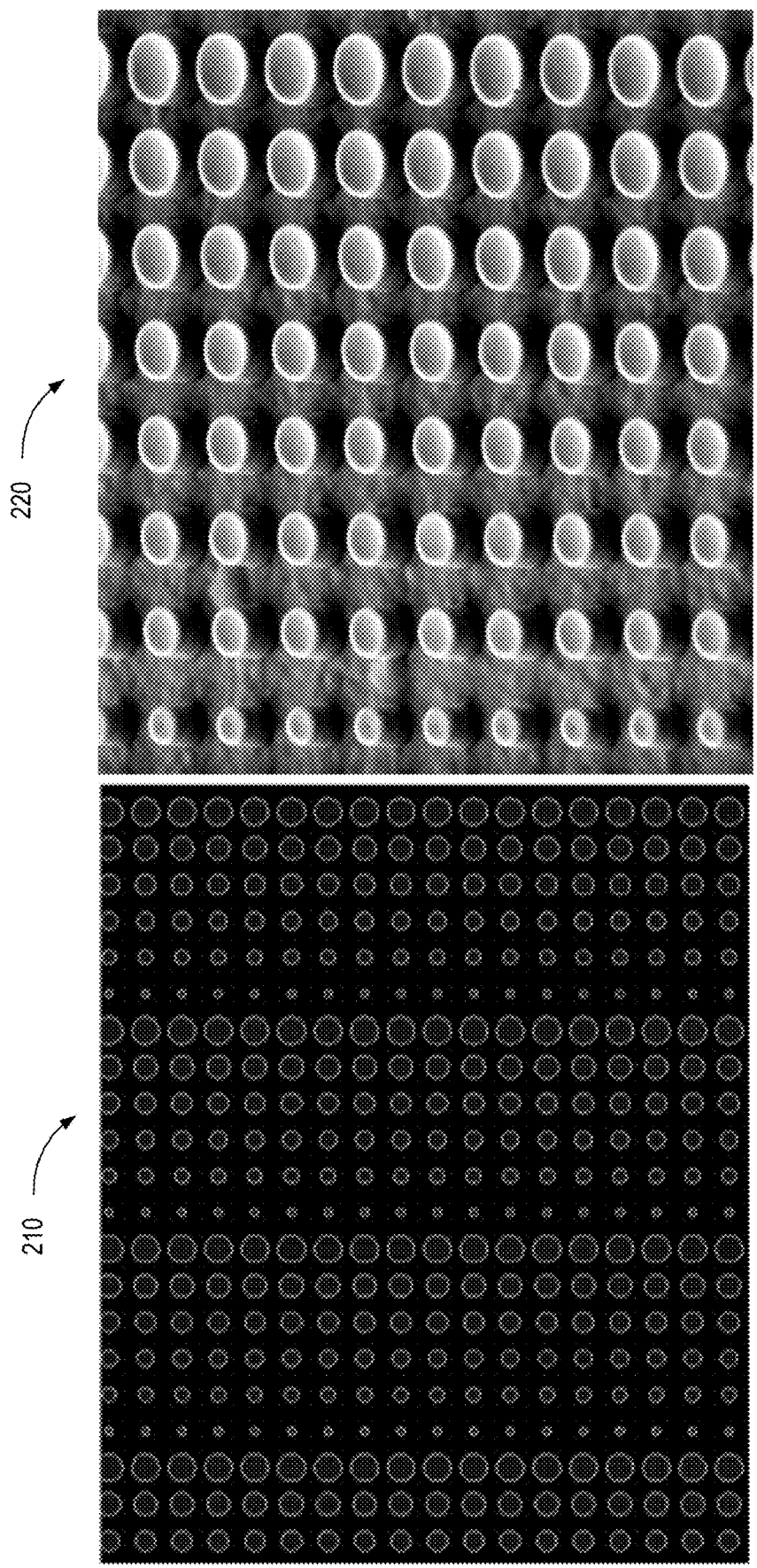

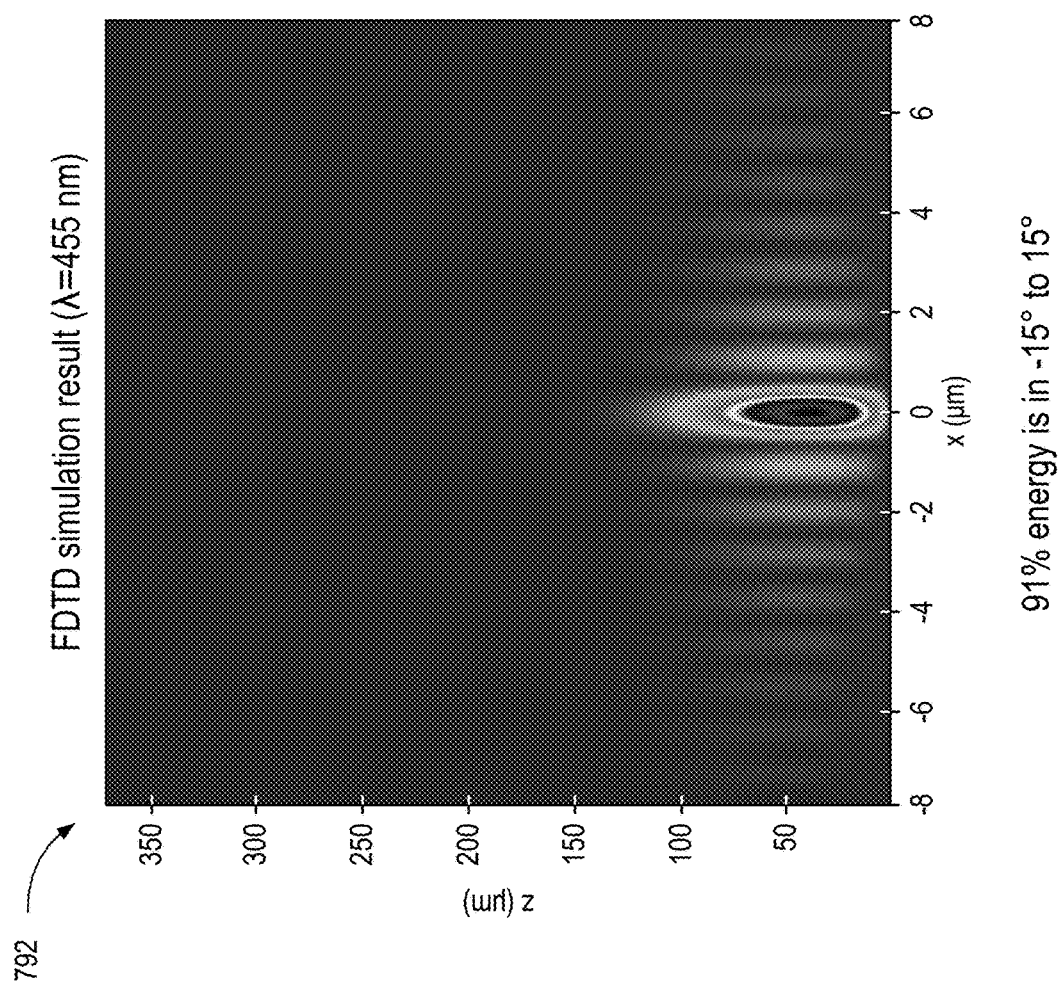

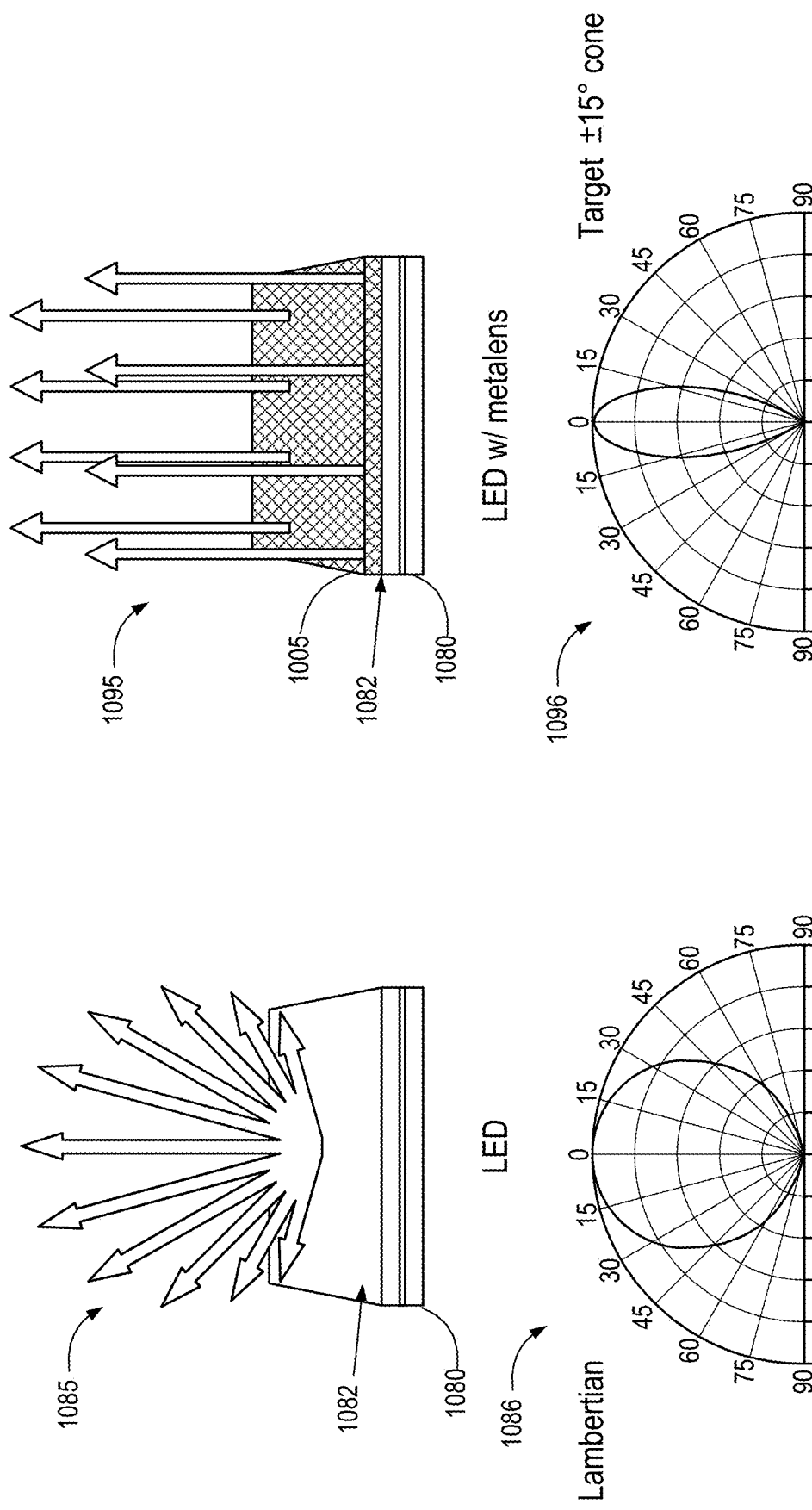

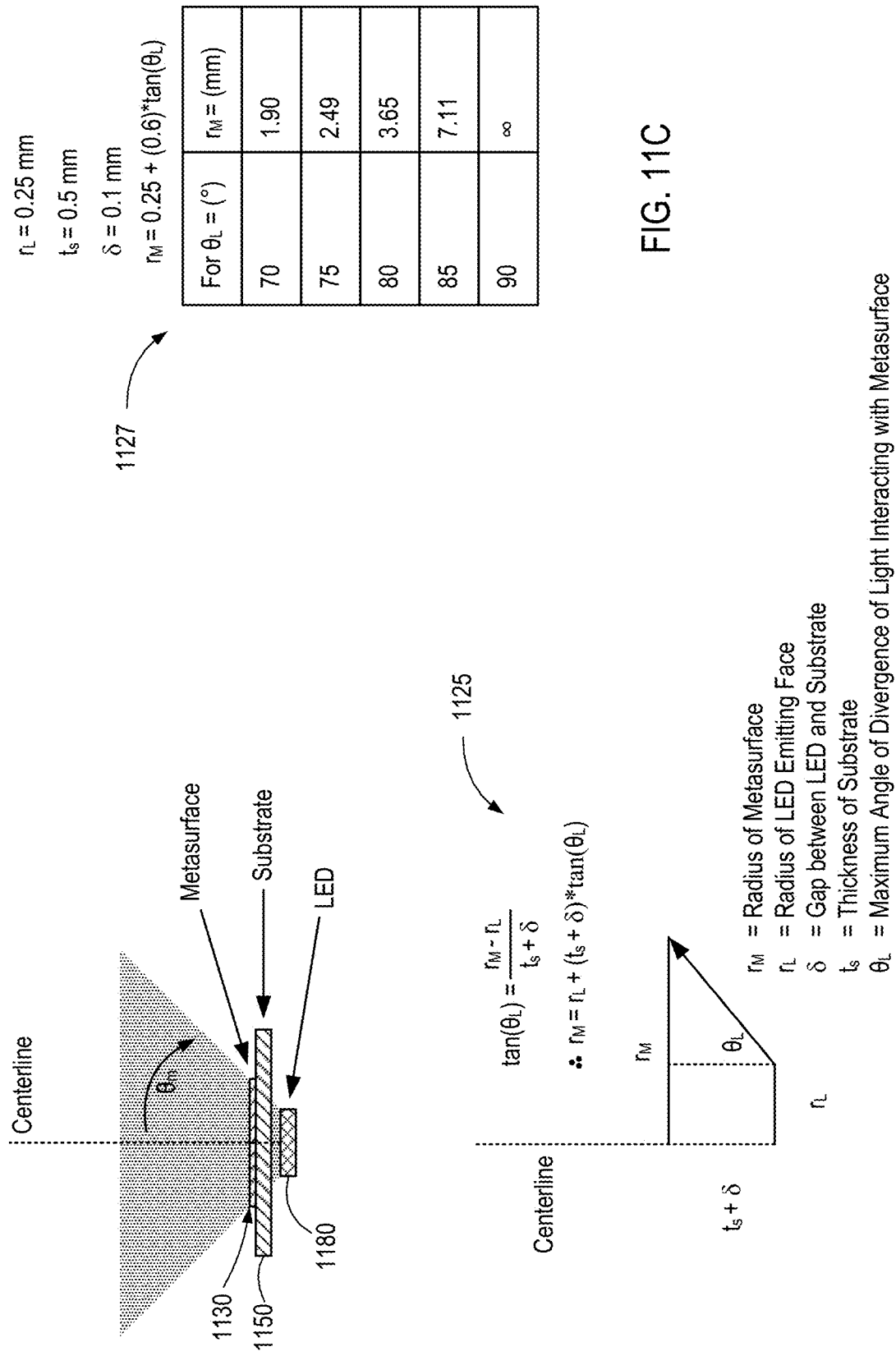

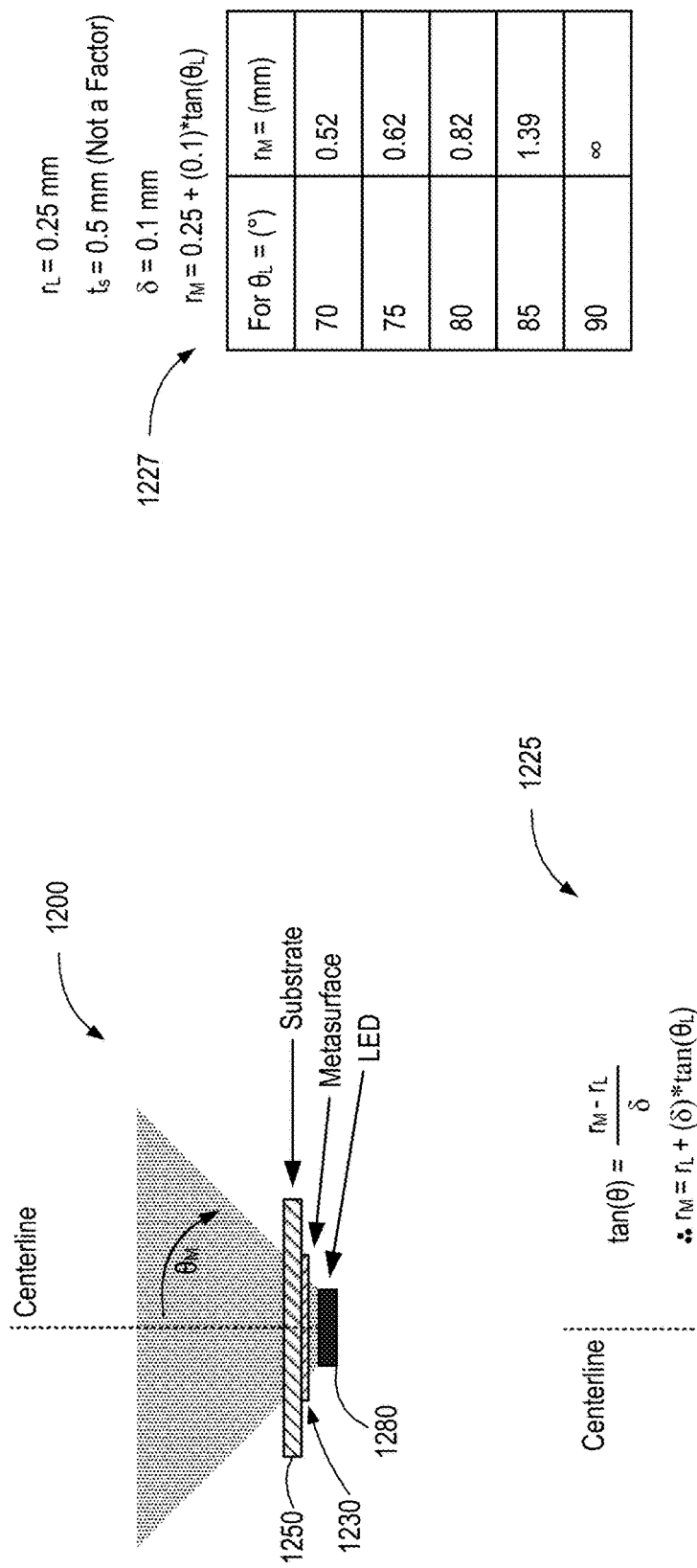

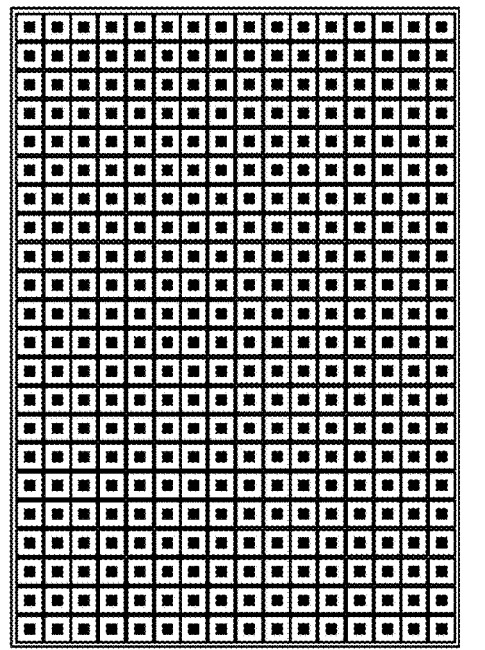
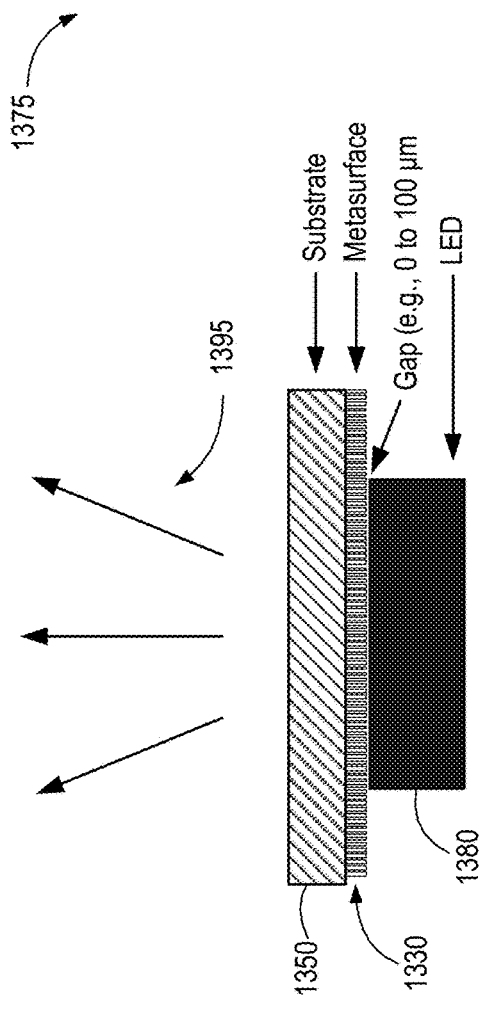
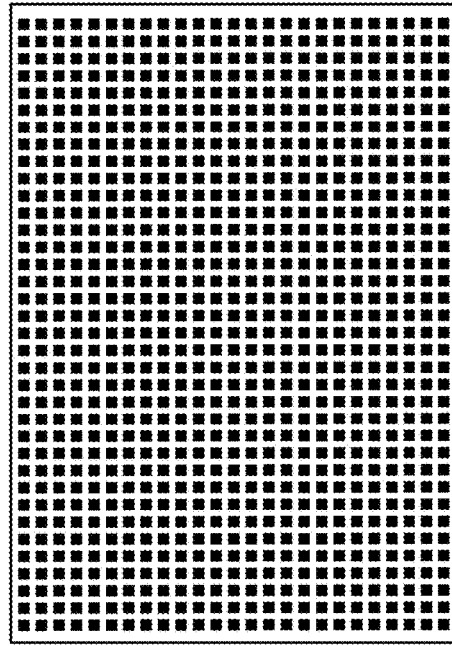
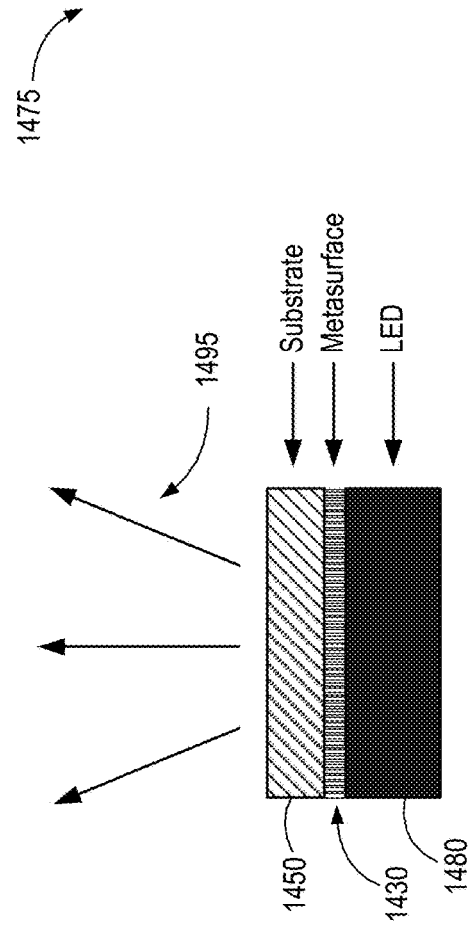
FIG. 13A
FIG. 13B
FIG. 14A
FIG. 14B

METALENS COLLIMATORS AND CONDENSERS

PRIORITY APPLICATIONS

This application claims benefit under 35 U.S.C. § 119 and priority to U.S. Provisional Patent Application No. 63/371,608 filed on Aug. 16, 2022, titled "Single-Element Metalens Collimators and Condensers," which application is hereby incorporated by reference in its entirety.

TECHNICAL FIELD

This disclosure relates to optical metamaterials. More specifically, this disclosure relates to transmissive optical metasurfaces and metalenses.

BRIEF DESCRIPTION OF THE DRAWINGS

FIG. 2A illustrates a top-down view of an example representation of a pattern of deflector elements for a metalens structure, according to one embodiment.

FIG. 2B illustrates an enlarged perspective view of the example representation of the pattern of deflector elements in the metalens of FIG. 2A, according to one embodiment.

FIG. 7H illustrates an FDTD simulation of a titanium dioxide concentrator metalens mounted on a blue LED, according to one embodiment.

FIG. 10A illustrates a block diagram of an LED with a Lambertian emission profile, according to one embodiment.

FIG. 10B illustrates a block diagram of an LED with a metalens configured to collimate and/or condense the optical radiation from the LED into a target emission profile, according to one embodiment.

FIG. 11B illustrates geometric calculations associated with the metalens of FIG. 11A, according to one embodiment.

FIG. 11C illustrates a table of example metasurface radius values calculated for various angles of divergence values for an LED, according to one embodiment.

FIG. 12B illustrates geometric calculations associated with the inverted metalens of FIG. 12A, according to one embodiment.

FIG. 12C illustrates a table of example inverted metasurface radius values calculated for various angles of divergence values for an LED, according to one embodiment.

FIG. 13A illustrates a block diagram of an LED with an inverted metalens applied to an LED surface, according to one embodiment.

FIG. 13B illustrates a two-dimensional array of LEDs with inverted metalenses, according to one embodiment.

FIG. 14A illustrates a block diagram of an LED with an inverted metalens with a matched aperture applied to an LED surface, according to one embodiment.

FIG. 14B illustrates a two-dimensional array of LEDs with matched-aperture inverted metalenses, according to one embodiment.

DETAILED DESCRIPTION

Figure 1A:
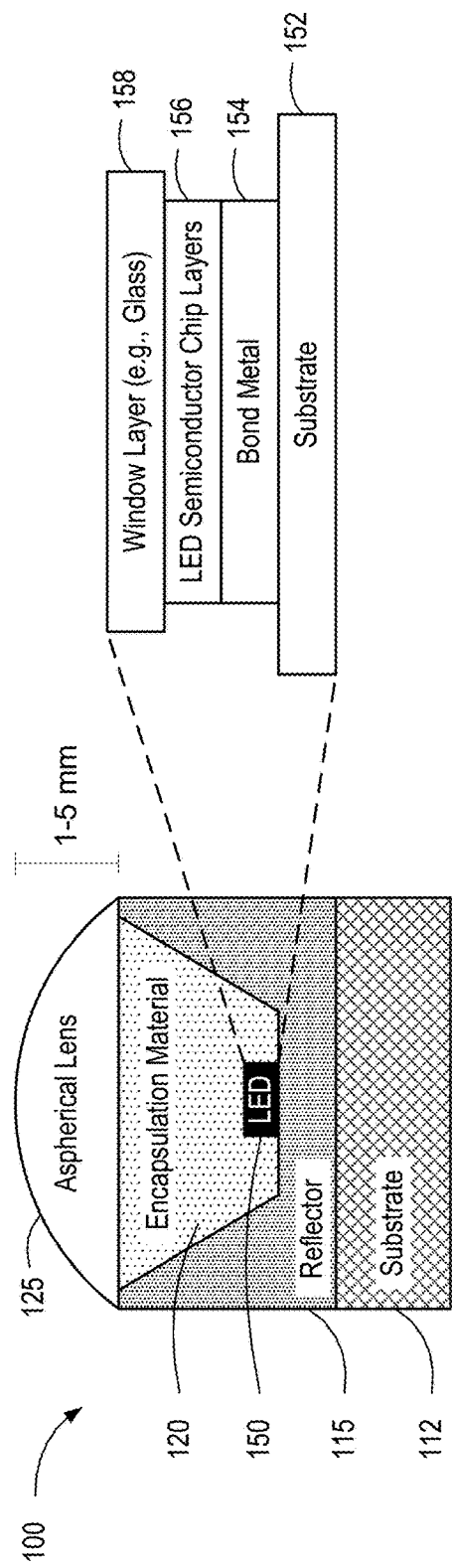
FIG. 1A illustrates an example of a light-emitting diode (LED) with a reflector and aspherical lens, according to one embodiment.

Various embodiments, systems, apparatuses, and methods are described herein that relate to condensing, concentrating, and collimating optical radiation generated by a light-emitting diode. Many electronic displays and other imaging technologies utilize multi-pixel LED arrays to generate optical radiation at various wavelengths (e.g., different visible colors of light) using at least three different colors of LED subpixels (e.g., red, green, and blue subpixels for an RGB display). In some embodiments, a single LED (e.g., a monochrome LED) may be used as the illumination source for a display (e.g., as a backlight). Traditional glass or plastic optics may be used to condense, concentrate, and/or collimate the optical radiation generated by the monochrome LED. Examples of traditional optics include lenses that are relatively large (e.g., thick) and have relatively long minimum focal lengths. In fact, thicker lenses are generally required to attain shorter focal lengths. Traditional optics result in an LED and multi-element lens assembly that is several centimeters thick. Even more recent developments utilizing microlens arrays either have a thickness in excess of a few millimeters (or even centimeters) and/or their effective focal lengths are relatively long (e.g., several millimeters or even centimeters).

Moreover, traditional optical elements scatter and absorb some of the light, resulting in optical transmission efficiencies that are less than optimal or desirable. Additionally, traditional optics are far less efficient with incoherent light and light originating from a source with a large angular spread (e.g., an LED source) as compared to coherent light from a laser source.

This disclosure describes several embodiments and variations of metalenses formed as an array of pillars having subwavelength dimensions (e.g., radii, lengths, widths, and/or heights) and sub-wavelength interelement spacings (e.g., the spacing between adjacent pillars in a given metalens is less than an operational wavelength). The metalenses described herein allow for LED assemblies with reduced thickness, high concentration efficiencies, and cost-effective mass production. As described herein, the pillars or nanopillars may be manufactured using titanium dioxide, polysilicon, silicon nitride, amorphous silicon, silicon rich nitride, hydrogenated silicon rich silicon nitride, and/or hydrogenated amorphous silicon (a-H-Silicon).

As described herein, a substrate surface may be configured as a transmissive surface to allow optical radiation to pass therethrough. Subwavelength-scale features (e.g., pillars) may be patterned on the surface of the substrate to deflect incident optical radiation in a controlled manner to obtain a target optical radiation output. Such a device is referred to herein as a metalens. Various embodiments and variations of metalenses are described herein. Metalenses are broadly defined herein to encompass both transmissive and reflective devices. Thus, while most of the examples are described in terms of transmissive metalenses, it is appreciated that many of the embodiments could be implemented using reflective metalenses, which might be manufactured to be thinner due to the optical radiation passing through the metasurface elements twice.

In some embodiments, subwavelength-scale features may be formed on more than one surface of the substrate. For example, subwavelength-scale features may be formed on a receiving side of a transmissive substrate and/or an output side of the transmissive substrate. A metalens may be used to deflect optical radiation within free space (e.g., air) or to couple optical radiation between free space and another transmissive medium, such as a waveguide, traditional optical lenses, a fiber optic transmission line, or the like.

According to various embodiments, the metalenses described herein may be fabricated using any of a wide variety of suitable manufacturing techniques, including, without limitation nanoimprinting manufacturing techniques, CMOS fabrication techniques, and/or ultraviolet lithography processes. For example, such processes may be used to fabricate the material layers herein that form an array of etchings, holes, gaps, pillars, slots, channels, grooves, or other deflector elements.

In some examples, an optical display device includes a light-emitting diode (LED), such as a surface mount LED or another type of LED. The light-emitting diode may have a planar face from which the optical radiation is emitted. The planar face may be, for example, a rectangular planar surface. The light or optical radiation emitted from the planar face may be modeled as having a Lambertian emission profile from a point source (e.g., at the center of the rectangular planar surface or as a two-dimensional array of small point source emitters distributed across the emitting face of the LED). The presently described metalens configurations may also be used with LEDs modeled to have non-Lambertian emission profiles.

The LED generates optical radiation within an operational wavelength band with a divergent emission profile (e.g., a Lambertian emission profile) relative to a planar face. A metalens may be positioned to modify the divergent emission profile of the optical radiation from the LED to have a modified transmission profile. For example, the metalens may operate to modify the optical radiation from a Lambertian emission profile to a condensed, focused, concentrated, or collimated profile.

In various embodiments, the metalens includes a substrate and a two-dimensional array of passive pillars that extend therefrom with varying pillar diameters. For example, the metalens may include a substrate and a two-dimensional array of passive pillars that extend from the substrate with a radially symmetric pattern of varying pillar diameters. In other embodiments, the passive pillars may extend from the substrate in a disordered array with diameters selected to produce a radially symmetric beam. In still other embodiments, a three-dimensional non-periodic structure approximating a volumetric hologram may be utilized. The structures may have high indices of refraction (e.g., n>2, depending on the particular material utilized) and/or low optical absorption. The structures may be manufactured using, for example, titanium dioxide, silicon nitride, amorphous silicon, silicon rich nitride, hydrogenated silicon rich silicon nitride, and hydrogenated amorphous silicon (a-H-Silicon), and/or polysilicon. The dimensions of each pillar and the subwavelength interelement spacing between adjacent pillars may be selected as a function of the operational wavelength. The specific diameters, uniform height, and uniform spacing distance of the pillars create a target phase gradient that modifies the divergent emission profile of the optical radiation from the LED to have the modified transmission profile.

As described herein, the dimensions and operational characteristics of the metalens may be varied based on the specific materials used to form the radially symmetric pattern of pillar diameters. For example, specific dimensions may be selected, as described herein, for passive pillars formed from titanium dioxide. Different dimensions and operational characteristics can be attached by using polysilicon or other materials.

In various examples, the planar face of the LED is rectangular (e.g., square), and the metalens is formed to have a corresponding rectangular aperture (e.g., a square aperture). In many embodiments, the thickness of the metalens may be less than 1.5 millimeters, such as 1 millimeter or less. The metalens may be mounted a few hundred microns from the planar face of the LED, directly on a window or protective covering applied to the planar face of the LED, within a few or tens of micrometers, or directly on the planar face of the LED. In some embodiments, an index matching fluid, index matching gel, or index matching solid may be used to fill a gap between the metalens and the planar face of the LED or the window or protective covering on the planar face of the LED. In some embodiments, as described herein, the metalens may be positioned on or relative to (e.g., mounted to or manufactured on) the emissive planar face of the LED in an inverted configuration in which the passive pillars are in contact with (or minimally spaced from) the planar face of the LED. In such a configuration, the passive pillars are positioned between the planar face of the LED and the substrate from which the passive pillars extend.

The aperture of the metalens can be defined as having a radius, regardless of whether the metalens has a circular aperture, a square aperture, a rectangular aperture, or another aperture shape. In some embodiments, the aperture of a square metalens may be defined in terms of a side length and the aperture of a rectangular metalens may be defined in terms of the side lengths. In embodiments in which metalens is positioned with a spacing distance or gap between the metalens and the window layer, the radius or aperture of the metalens is selected as a function of a thickness of the window layer and the spacing distance between the metalens and the window layer.

In various embodiments, an optical assembly is formed to include a two-dimensional array of LEDs. Each LED generates optical radiation at an operational wavelength (e.g., within an operational wavelength band) with a divergent emission profile relative to a planar face thereof. A two-dimensional array of metalenses is positioned as a layer to receive the optical radiation from the two-dimensional array of LEDs. Each metalens is positioned relative to one (or more) of the LEDs to modify the divergent emission profile of the emitted optical radiation to have a modified transmission profile.

In some embodiments, an optical display is manufactured with integrated inverted metalenses or integrated metasurface elements (e.g., pillars), as described in greater detail herein. The optical display may include a two-dimensional array of LEDs that emit a narrow band of optical radiation from an emission or planar face with a Lambertian emission profile. Each LED includes an integrated metalens in an inverted configuration with a two-dimensional array of passive pillars that extend between the planar face of the LED and a substrate. As previously described, the passive pillars may be arranged in a radially symmetric pattern of varying pillar diameters, and the diameter of each pillar and interelement spacings may be selected as a function of an operational wavelength of the optical radiation emitted by the LED. The integrated inverted metalens functions to provide a target phase gradient that modifies the Lambertian emission profile of the optical radiation generated by the LED to have a modified transmission profile (e.g., collimated, condensed, focused, etc.).

The generalized descriptions of the systems and methods herein may be utilized and/or adapted for utilization in a wide variety of industrial, commercial, and personal applications. Similarly, the presently described systems and methods may be used in conjunction with or utilize existing computing devices and infrastructures. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include one or more special-purpose processing devices, such as application-specific integrated circuits (ASICs), a programmable array logic (PAL), a programmable logic array (PLA), a programmable logic device (PLD), a field-programmable gate array (FPGA), or another customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail in order to avoid obscuring aspects of this disclosure. The embodiments of the systems and methods provided within this disclosure are not intended to limit the scope of the disclosure but are merely representative of possible embodiments. In addition, the steps of a method do not necessarily need to be executed in any specific order or even sequentially, nor do the steps need to be executed only once.

FIG. 1A illustrates an example of a light-emitting diode (LED) package 100 with a reflector 115 and an aspherical lens 125, according to one embodiment. In the illustrated embodiment, the reflector is mounted on a substrate 112. An encapsulation material 120 protects the LED 150 and fills the reflector 115. The aspherical lens 125 may be made of glass, acrylic, or another optically transparent material suitable for manufacturing a refractive lens. As illustrated, the aspherical lens 125 may itself have a thickness between 1 and 5 mm, depending on the specific design of the lens. The reflector 115 may have a thickness of several millimeters or even centimeters, and the substrate 112 may add a few more millimeters to the overall thickness of the LED package 100.

As illustrated, the actual LED 150 may include a substrate 152, a layer of bond metal 154, semiconductor layers 156, and a window layer 158 (e.g., glass, sapphire, silicon, etc.). While the LED 150 itself is relatively thin, the LED package 100, using reflector 115 and/or refractive optical elements such as the aspherical lens 125, is relatively thick (e.g., tens of millimeters).

Figure 1B:
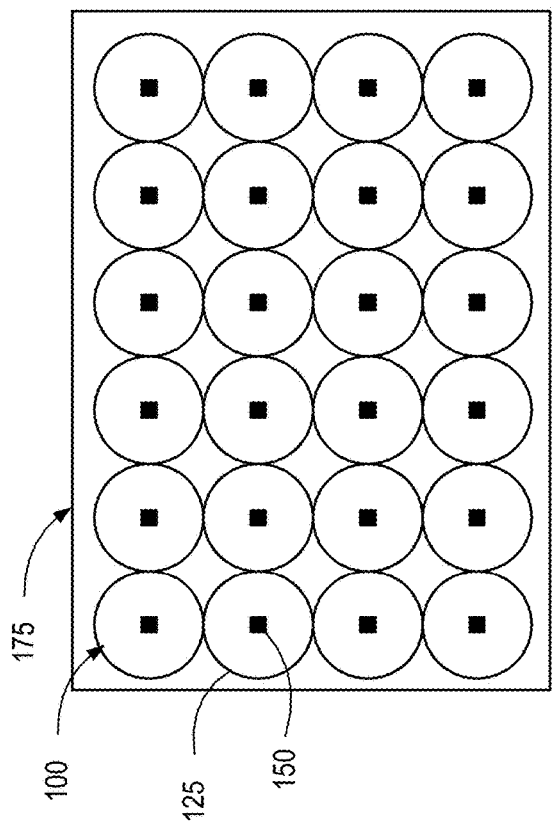
FIG. 1B illustrates a two-dimensional array of LEDs with aspherical lenses, according to one embodiment.

FIG. 1B illustrates a two-dimensional array 175 of LED packages 100 with aspherical lenses 125 to focus the light from underlying LEDs 150, according to one embodiment. As illustrated, the fill factor (or density or pitch) of the LEDs 150 in the two-dimensional array 175 of LED packages 100 is limited by the size of the diameter of the aspherical lens 125 required to focus the light from the LED 150. The thickness of the two-dimensional array 175 would also be in the tens of millimeters. The use of thinner optical elements, such as microlens arrays, might reduce the overall thickness of the two-dimensional array 175; however, the effective focal length or the condensing ability of thin optical elements using traditional refractive properties would be much longer and/or less condensing, respectively, and exhibit significantly more unwanted spherical aberration.

FIG. 2A illustrates a top-down view of an example representation of a pattern of deflector elements 210 for a metalens structure, according to one embodiment. As illustrated, a uniform square grid of deflector elements 210 may pattern the deflector elements 210 with uniform spacings between adjacent or nearest neighbor deflector elements with up to approximately a 100% fill factor. Moreover, the deflector elements 210 may be configured with uniform heights. In the illustrated example, the deflector elements 210 comprise circular pillars arranged in a repeating pattern of pillar diameters.

FIG. 2B illustrates an enlarged perspective view of the example representation of the pattern of deflector elements in the metalens of FIG. 2A, according to one embodiment. As illustrated, an array of deflector elements 220 includes a uniformly spaced arrangement of circular pillars extending from a substrate. The deflector elements 220 have different pillar diameters that increase along one dimension (left to right) and are constant along the other dimension (top to bottom). Alternative patterns of pillar diameters may be used to achieve target deflection patterns.

Figure 3A:
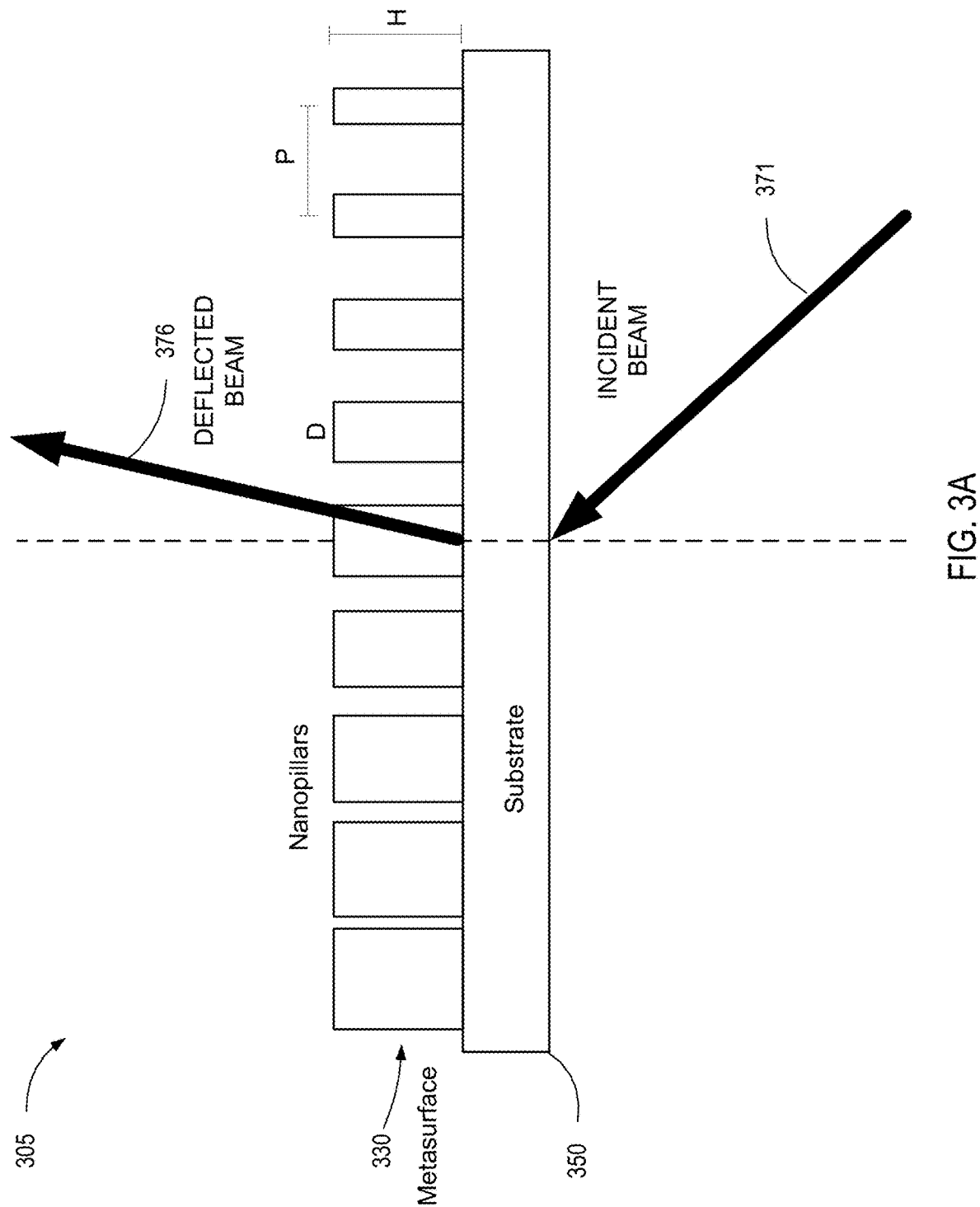
FIG. 3A illustrates an example block diagram of a side view of a metalens with nanopillar deflectors positioned on a substrate to transmissively steer incident optical radiation, according to one embodiment.

FIG. 3A illustrates an example block diagram of a side view of a metalens 305 with nanopillar deflector elements 330 positioned on a substrate 350, according to one embodiment. The metalens 305 transmissively steers or otherwise phase-modulates incident optical radiation 371 as deflected optical radiation 376 at a target deflection angle, beamform, or phase-modulated transmission profile. As illustrated, the nanopillar deflector elements 330 may have a uniform height, H, and varying diameters, D. In the illustrated example, the nanopillar deflector elements 330 are evenly spaced with a nearest neighbor on-center spacing distance, P.

The spacing between the centers of adjacent or nearest neighbor nanopillars may be constant despite the varying diameters of the pillars. As described herein, the dimensions, pattern, and spacings of the nanopillars are selected to achieve a target deflection pattern (e.g., angle of deflection, dispersion, collimation, convergence, and/or a combination thereof) and frequency response (e.g., target operational bandwidth of optical radiation). The interelement spacing may be on a square grid or another repeating geometric grid, such as a hexagonal grid.

Figure 3B:
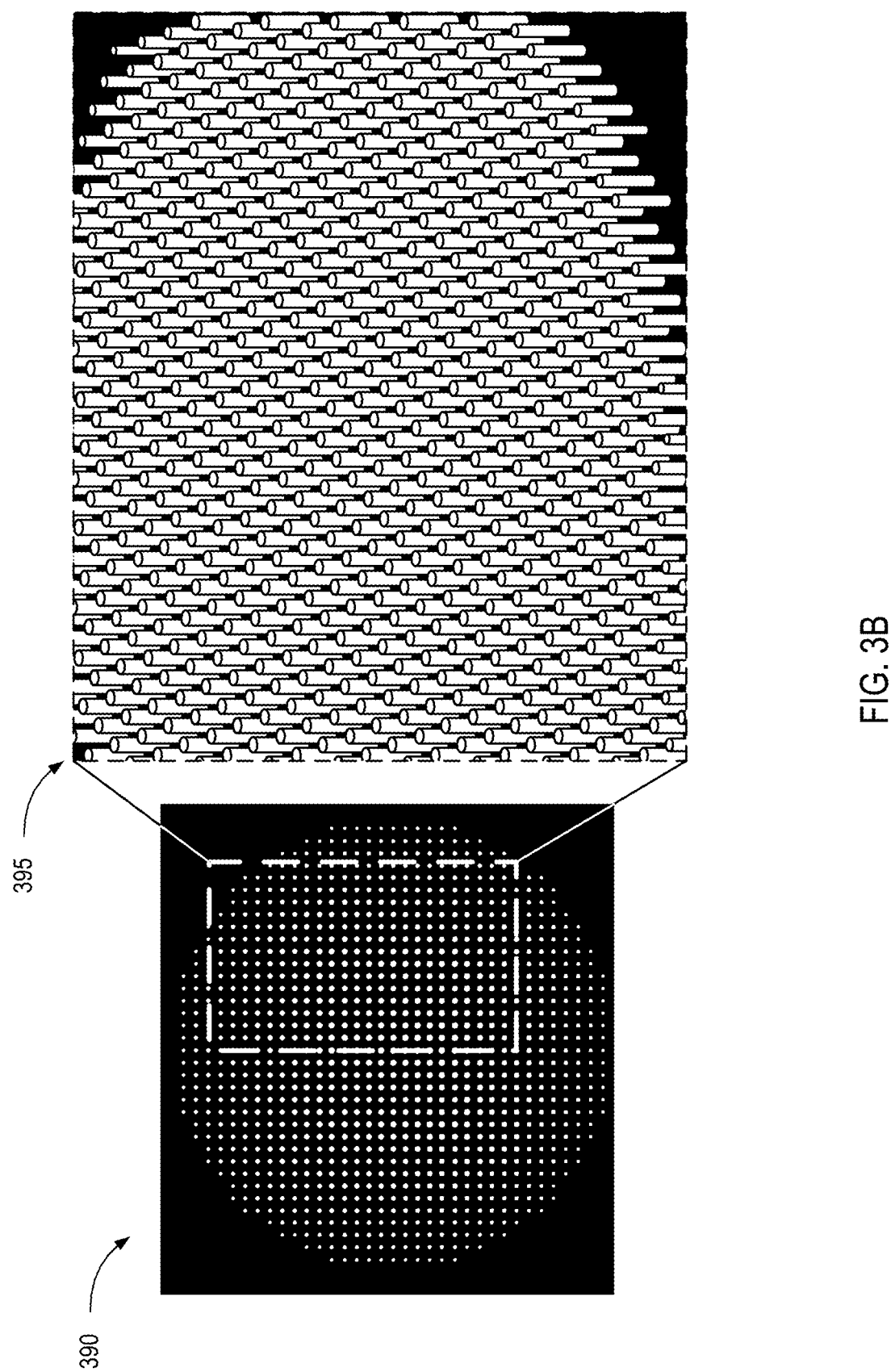
FIG. 3B illustrates a metalens with a radially symmetric pattern of pillar diameters to focus optical radiation, according to one embodiment.

FIG. 3B illustrates a metalens 390 with a radially symmetric pattern of pillar diameters to focus optical radiation, according to one embodiment. The pattern of diameters to attain a target deflection pattern can be calculated based on the subwavelength amplitude and phase response of each subwavelength pillar. In some instances, numerical simulations may be used to determine the pattern of diameters for a particular deflection pattern (e.g., to focus the optical radiation with an effective focal length). The metalens 390 may be circular, oval, irregularly shaped, or an n-sided polygon, such as a square or rectangle. Expanded window 395 shows an enlarged perspective view of the passive pillars forming the deflector elements of the metalens. Due to the limitations of the drawing, the different diameters of the pillars are not illustrated in the expanded window 395.

The illustrated example is not drawn to scale. For example, a metalens measuring four millimeters (4 mm) on each side would include millions or even hundreds of millions of pillars with varying diameters at uniform interelement spacings. Rather, the illustrated example is intended to facilitate the visualization of a possible pattern of radially symmetrical and radially repeating pillar diameters. The exact pillar diameters and relative sizes may vary and are based on the results of phase gradient calculations or simulation results.

Numerical simulations and/or calculations may be used in which the optical radiation emitted by the LED is modeled in a specific plane P$x$: $y$; $z$ as a spherical wave in parabolic approximation. The LED wavefront can be modeled as a spherical wave that allows for the determination (calculated or simulated) of a phase gradient or phase profile that needs to be imparted to the optical radiation from the LED. The determined phase profile or phase gradient can then be implemented via a pattern of pillar diameters. The metalens is manufactured with pillars having diameters that correspond to the determined phase gradient (e.g., phase profile) at each respective spatial location of the metalens. The spherical wave of the LED can be expressed as:

$$U_S(x, y, z) = A \cdot \exp\left(-\frac{i\pi}{\lambda z}\left[(x_0 + x)^2 + (y_0 + y)^2\right]\right),$$

where A is the amplitude, i is the imaginary unit number, λ is the wavelength, and z is the distance from the origin Px0; y0; 0. The simplified example above is merely representative of one possible example approach to determine a phase gradient or phase profile. It is appreciated that any of the various analytical formulas for lens calculations and holographic techniques may be utilized, as understood by those of skill in the art. For example, topological optimization approaches, such adjoint or inverse design approaches, may be utilized to determine a distribution of non-periodic structures to achieve a target optical performance (e.g., modify a divergent emission profile of optical radiation from an LED).

Figure 3C:
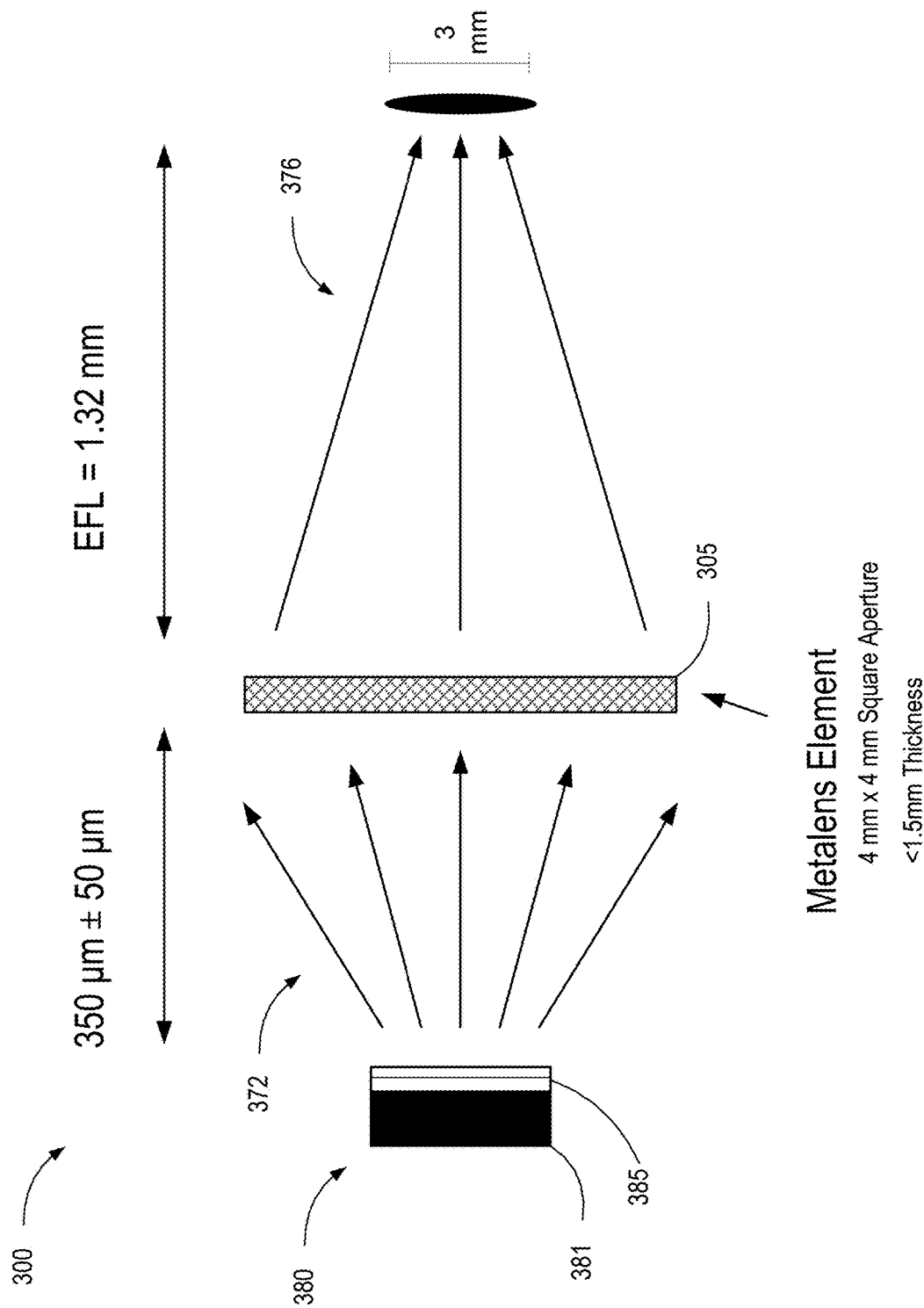
FIG. 3C illustrates an example block diagram of a metalens concentrator and condenser for an LED source, according to one embodiment.

FIG. 3C illustrates an example block diagram 300 of a concentrator and condenser metalens 305 with an LED 380, according to one embodiment. In the illustrated embodiment, the LED 380 may be square or rectangular (e.g., 0.5 millimeters×0.5 millimeters on each side) with a thickness of a few millimeters. The LED 380 may include substrate and semiconductor layers 381 with an optically transmissive window layer 385. The optical radiation emitted from the LED 380 may be modeled as being emitted from a point source (e.g., the center of the planar face of the LED 380), or a two-dimensional array of discrete point sources on the planar face of the LED 380, with a Lambertian emission profile. The metalens 305 may be less than 2 millimeters thick and, in many instances, may be less than 1 millimeter thick (illustrated as less than 1.5 millimeters). The metalens 305 may have a length and width selected as a function of the distance between the LED 380 and the metalens 305, which affects how much of the emitted light interacts with the metasurface, particularly at broad angles of emission.

In the illustrated embodiment, the metalens 305 is positioned approximately 350 micrometers (i.e., 0.350 millimeters) from the LED 380. The metalens 305 operates to receive the optical radiation 372 emitted with the Lambertian (or other divergent) emission profile and concentrate and/or condense the optical radiation as output optical radiation 376 to a spot size with a diameter of approximately 3 mm with an effective focal length of 1.32 millimeters. As described below, simulations of the metalens using titanium dioxide pillars arranged in a radially symmetric pattern allow for optical radiation concentration efficiencies exceeding 90% (normalized). The example dimensions provided are merely one example of possible dimensions to demonstrate an example functionality of the metalens 305. Additionally, it is readily apparent that the block diagram 300 is not drawn to scale.

Figure 4B:
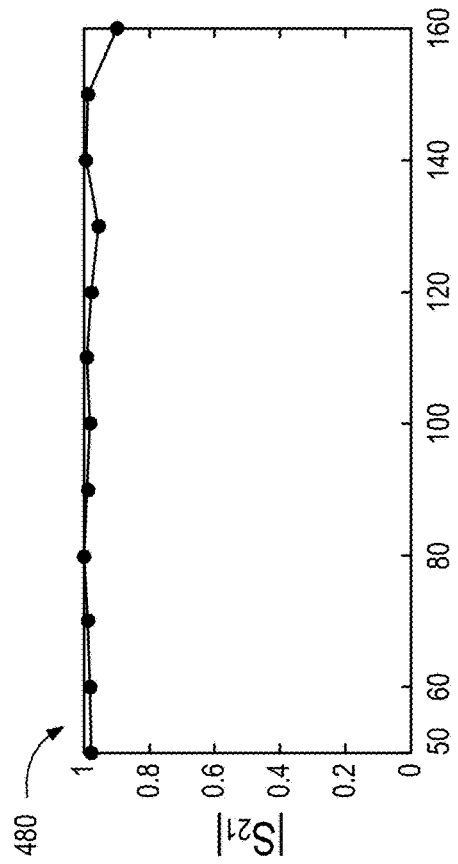
FIG. 4B illustrates a graph of the transmission efficiency of red optical radiation for pillars having various radii, according to one embodiment.
Figure 4C:
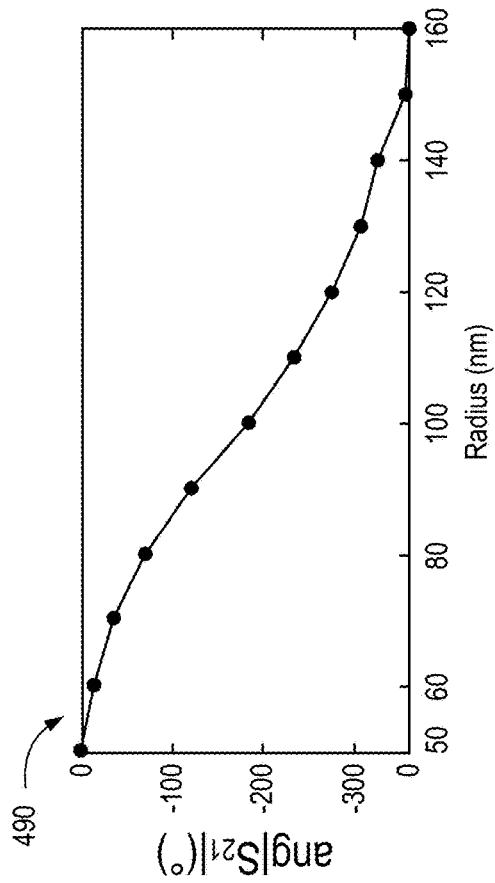
FIG. 4C illustrates a graph of the phase shift of red optical radiation associated with pillars having various radii, according to one embodiment.
Figure 4A:
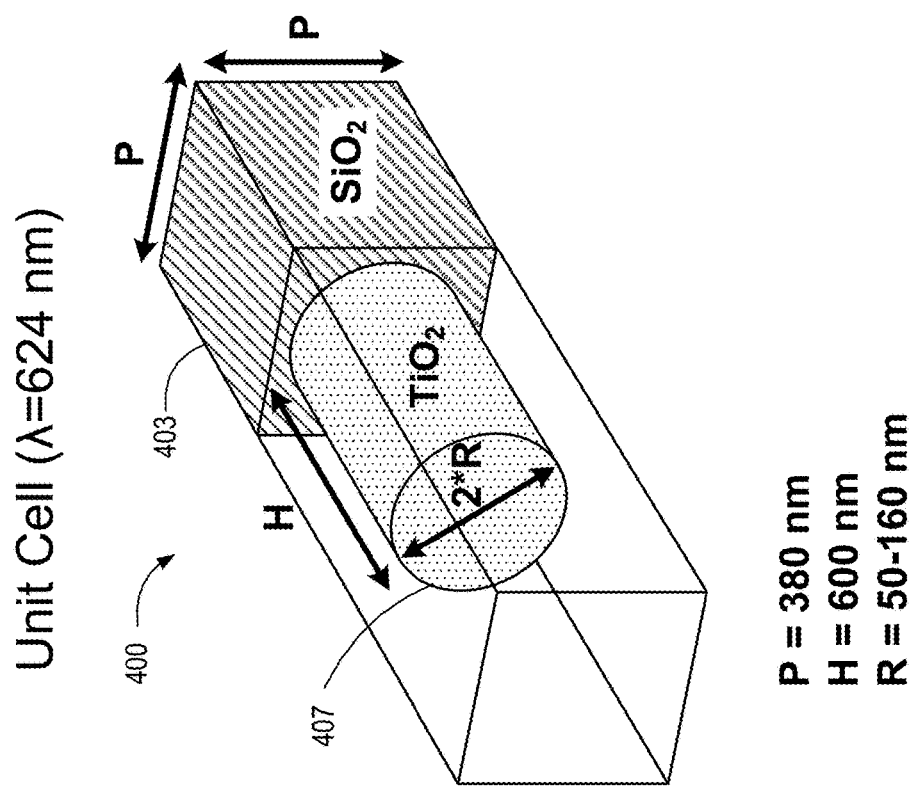
FIG. 4A illustrates an example of a unit cell of a transmissive metasurface for red optical radiation, according to one embodiment.

FIG. 4A illustrates an example of a unit cell 400 of a transmissive metalens for red optical radiation, according to one embodiment. As illustrated, a titanium dioxide (TiO$_2$) pillar 407 extends from a silicon dioxide (SiO$_2$) substrate 403. The unit cell 400 is square with a width of approximately 380 nanometers that corresponds to the on-center interelement spacing of an array of unit cells forming a metalens. The pillar 407, or cylindrical deflector element, extends from the silicon dioxide substrate 403 with a height of approximately 600 nanometers. The substrate 403 may, for example, have a thickness of less than 1.5 millimeters (e.g., 0.5 millimeters in many embodiments).

A metalens formed to condense red optical radiation may include a radially symmetric pattern of unit cells 400 with pillars 407 that have diameters ranging from approximately 100 nanometers to 320 nanometers (radii ranging from 50 nanometers to 160 nanometers) to attain phase shifts exceeding a 2π range. In some embodiments, a metalens may be manufactured with pillar diameters to attain phase shifts less than a 2π range. For example, some applications may be adequately served by a metalens with pillar diameters that attain phase shifts within a 0-π range.

FIG. 4B illustrates a graph 480 of the transmission efficiency of red optical radiation at 624 nanometers (with a 20-30 nanometer bandwidth) for titanium dioxide pillars having radii between approximately 50 nanometers and 160 nanometers.

FIG. 4C illustrates a graph 490 of the phase shift of red optical radiation associated with titanium dioxide pillars having radii between approximately 50 nanometers and 160 nanometers.

Figure 4D:
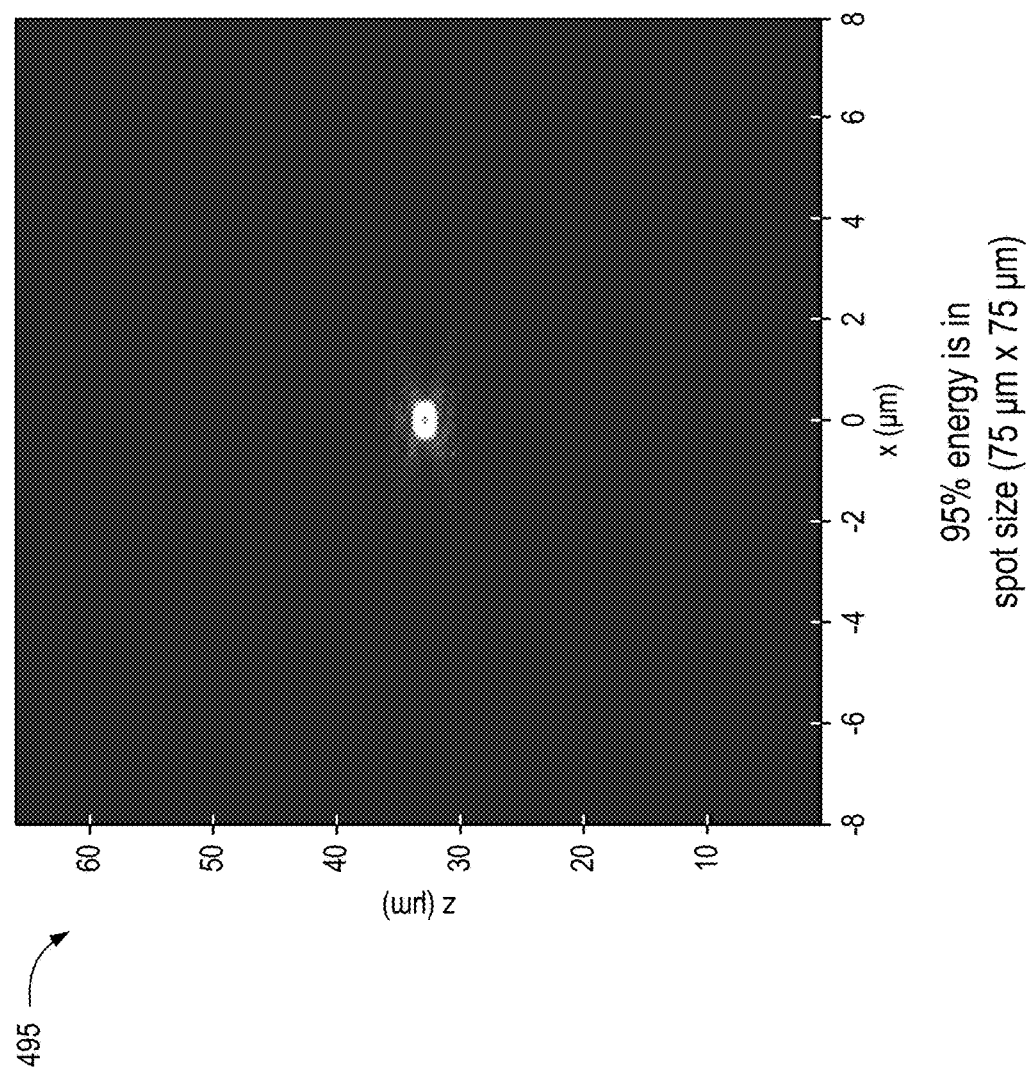
FIG. 4D illustrates a finite-difference time-domain (FDTD) simulation of a metalens with a radially symmetric pattern of pillar diameters focusing red optical radiation, according to one embodiment.

FIG. 4D illustrates a finite-difference time-domain (FDTD) simulation 495 of a metalens with a radially symmetric pattern of pillar diameters focusing red optical radiation, according to one embodiment. Due to simulation limitations, a metalens scaled from 4 mm to 100 micrometers with a scaled effective focal length of 33 micrometers is simulated, resulting in a spot size of 75 micrometers. According to the simulation, the normalized efficiency is approximately 95%.

Figure 5B:
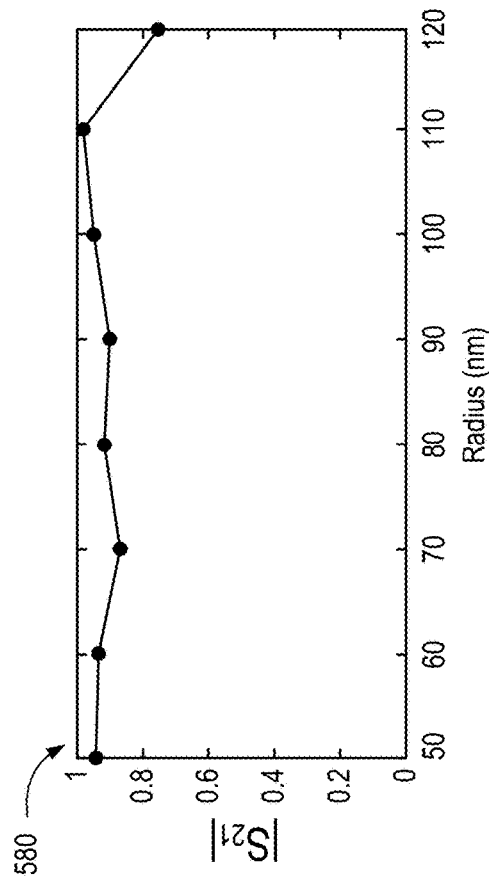
FIG. 5B illustrates a graph of the transmission efficiency of green optical radiation for pillars having various radii, according to one embodiment.
Figure 5C:
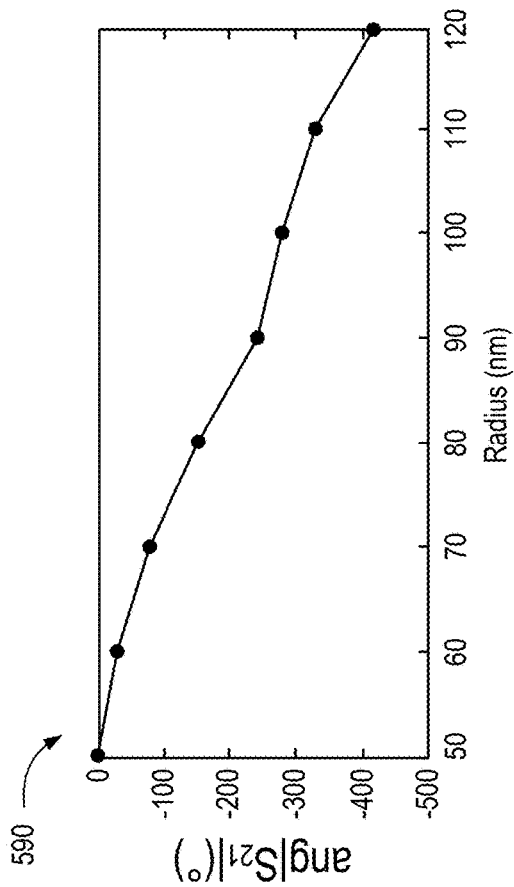
FIG. 5C illustrates a graph of the phase shift of green optical radiation associated with pillars having various radii, according to one embodiment.
Figure 5A:
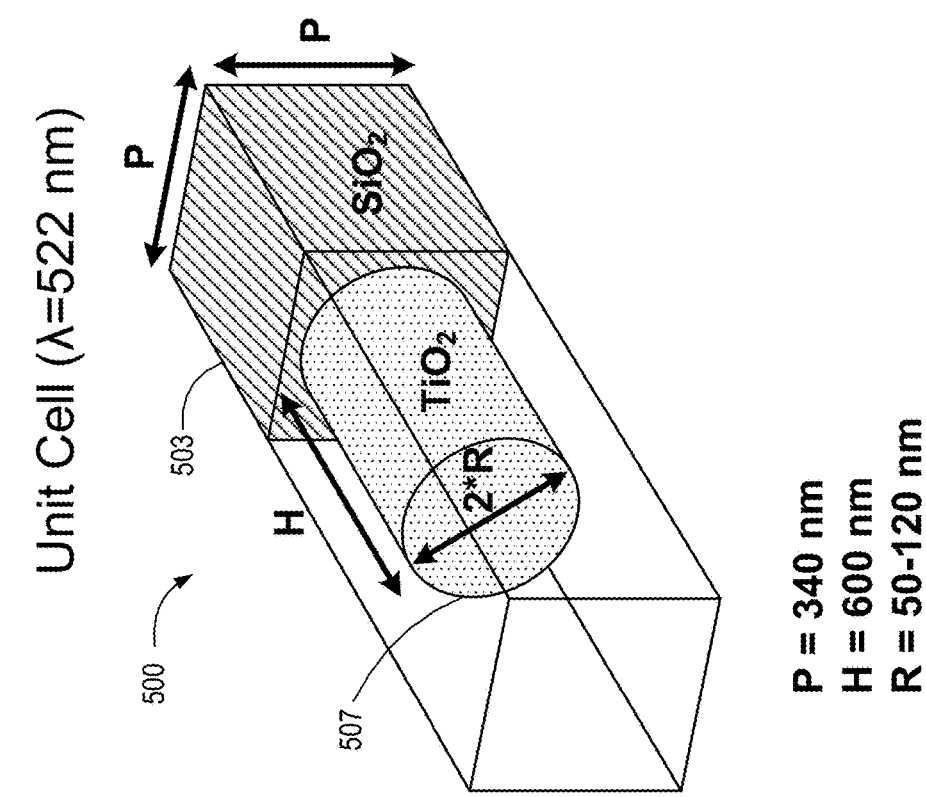
FIG. 5A illustrates an example of a unit cell of a transmissive metasurface for green optical radiation, according to one embodiment.

FIG. 5A illustrates an example of a unit cell 500 of a transmissive metalens for green optical radiation, according to one embodiment. As illustrated, a titanium dioxide (TiO$_2$) pillar 507 extends from a silicon dioxide (SiO$_2$) substrate 503. The unit cell 500 is square with a width of approximately 340 nanometers that corresponds to the on-center interelement spacing of an array of unit cells 500 forming a metalens. The pillar 507, or cylindrical deflector element, extends from the silicon dioxide substrate 503 with a height of approximately 600 nanometers.

A metalens formed to condense green optical radiation may include a radially symmetric pattern of unit cells 500 with pillars 507 that have diameters ranging from approximately 100 nanometers to 240 nanometers (radii ranging from 50 nanometers to 120 nanometers) to attain phase shifts exceeding a 2π range.

FIG. 5B illustrates a graph 580 of the transmission efficiency of green optical radiation at 522 nanometers (with a 20-30 nanometer bandwidth) for titanium dioxide pillars having radii between approximately 50 nanometers and 120 nanometers.

FIG. 5C illustrates a graph 590 of the phase shift of green optical radiation associated with titanium dioxide pillars having radii between approximately 50 nanometers and 120 nanometers.

Figure 5D:
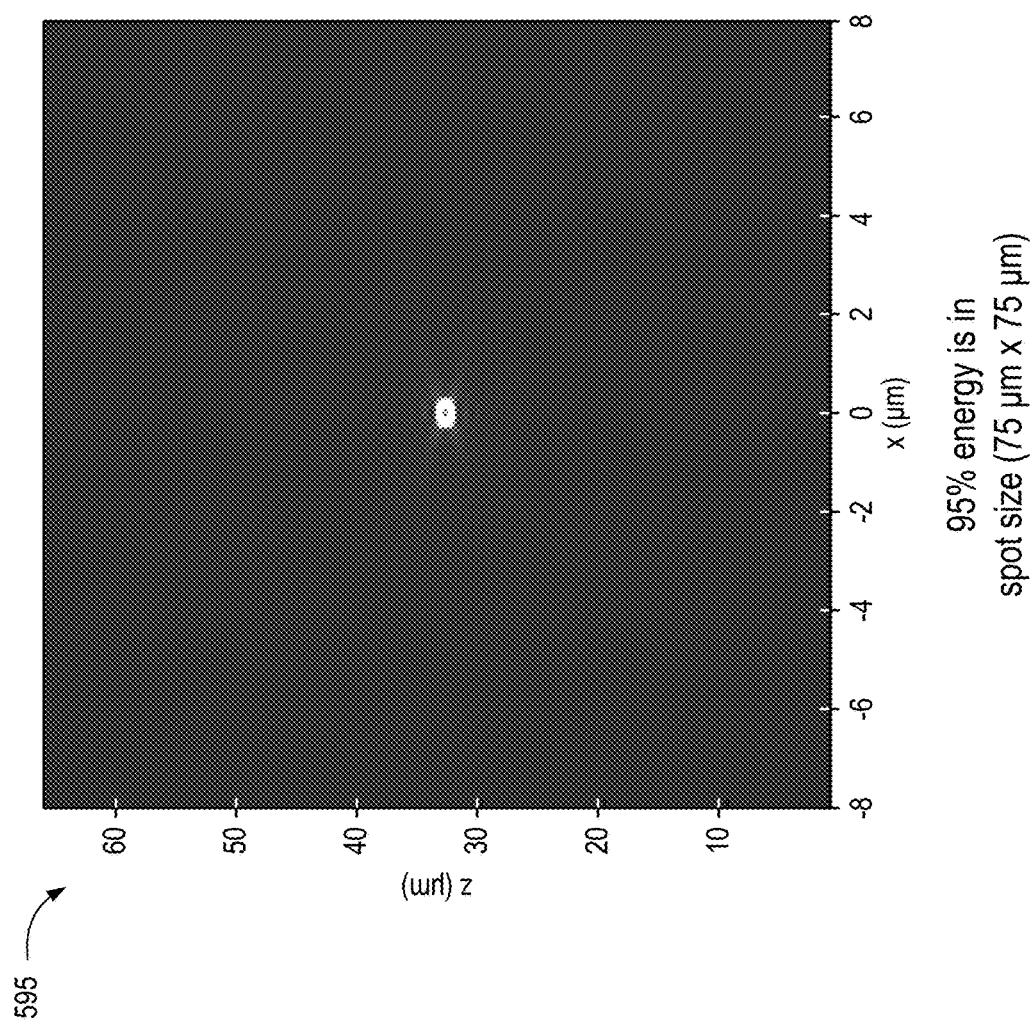
FIG. 5D illustrates an FDTD simulation of a metalens with a radially symmetric pattern of pillar diameters focusing green optical radiation, according to one embodiment.

FIG. 5D illustrates an FDTD simulation 595 of a metalens with a radially symmetric pattern of pillar diameters focusing green optical radiation, according to one embodiment. Again, using a metalens scaled from 4 mm to 100 micrometers with a scaled effective focal length of 33 micrometers is simulated, resulting in a spot size of 75 micrometers with a normalized efficiency of approximately 94%.

Figure 6B:
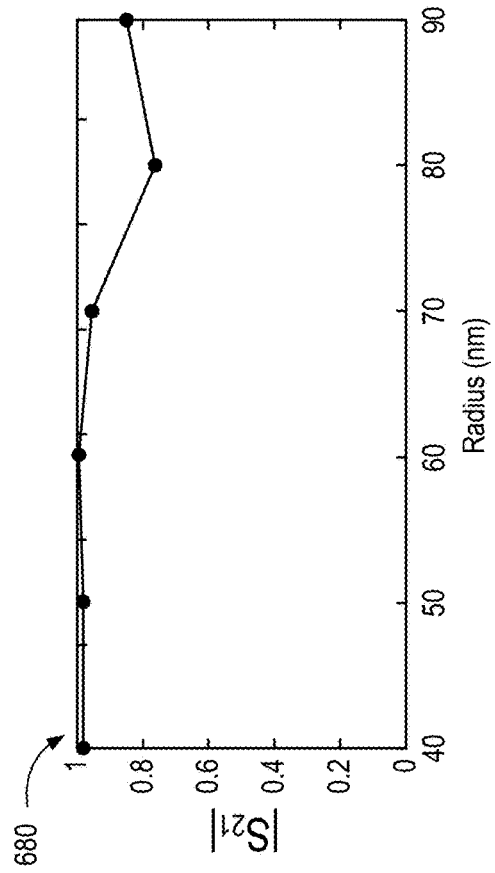
FIG. 6B illustrates a graph of the transmission efficiency of blue optical radiation for pillars having various radii, according to one embodiment.
Figure 6C:
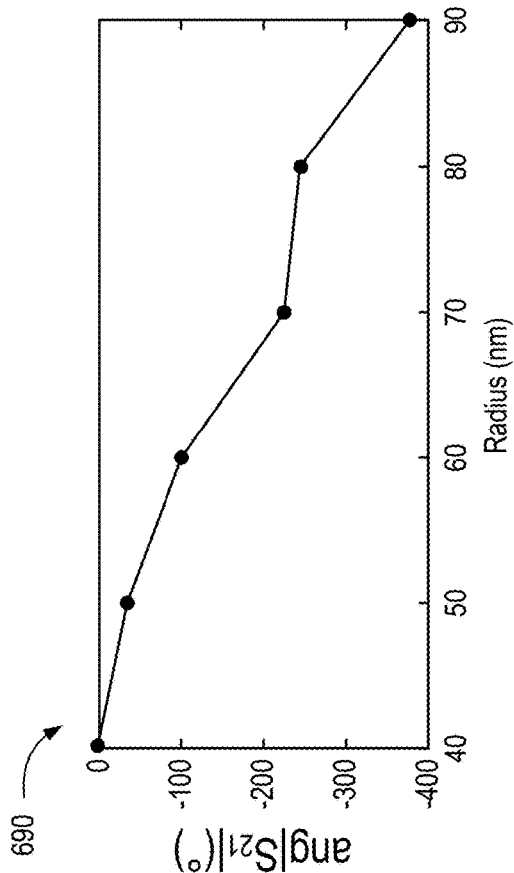
FIG. 6C illustrates a graph of the phase shift of blue optical radiation associated with pillars having various radii, according to one embodiment.
Figure 6A:
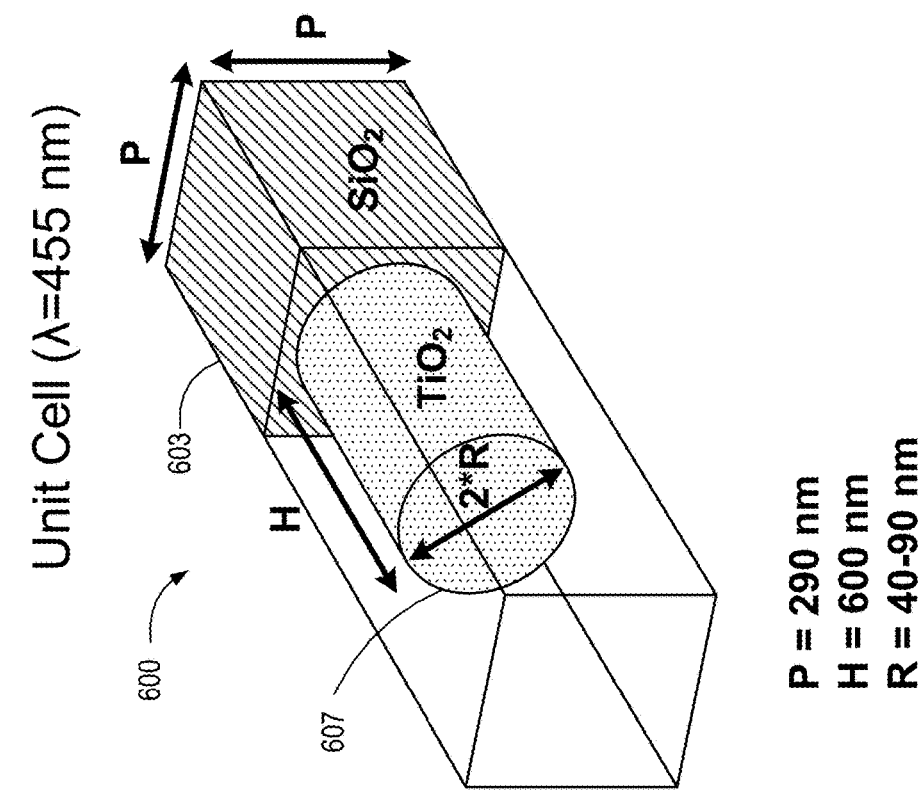
FIG. 6A illustrates an example of a unit cell of a transmissive metasurface for blue optical radiation, according to one embodiment.

FIG. 6A illustrates an example of a unit cell 600 of a transmissive metalens for blue optical radiation, according to one embodiment. As illustrated, a titanium dioxide (TiO$_2$) pillar 607 extends from a silicon dioxide (SiO$_2$) substrate 603. The unit cell 600 is square with a width of approximately 290 nanometers that corresponds to the on-center interelement spacing of an array of unit cells 600 forming a metalens. The pillar 607, or cylindrical deflector element, extends from the silicon dioxide substrate 603 with a height of approximately 600 nanometers.

A metalens formed to condense green optical radiation may include a radially symmetric pattern of unit cells 600 with pillars 607 that have diameters ranging from approximately 80 nanometers to 180 nanometers (radii ranging from 40 nanometers to 90 nanometers) to attain phase shifts exceeding a 2π range.

FIG. 6B illustrates a graph 680 of the transmission efficiency of blue optical radiation at 455 nanometers (with a 20-30 nanometer bandwidth) for titanium dioxide pillars having radii between approximately 40 nanometers and 90 nanometers.

FIG. 6C illustrates a graph 690 of the phase shift of blue optical radiation associated with titanium dioxide pillars having radii between approximately 40 nanometers and 90 nanometers.

Figure 6D:
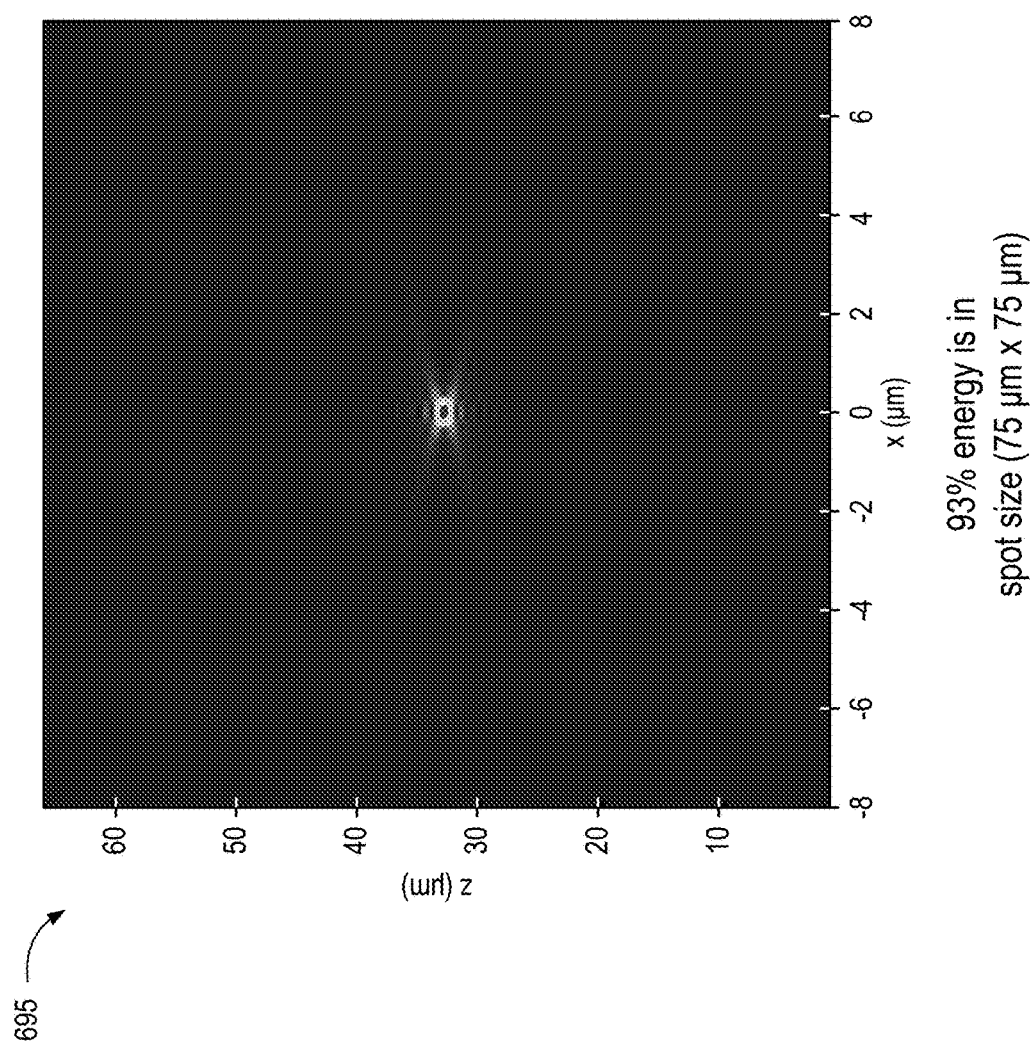
FIG. 6D illustrates an FDTD simulation of a metalens with a radially symmetric pattern of pillar diameters focusing blue optical radiation, according to one embodiment.

FIG. 6D illustrates an FDTD simulation 695 of a metalens with a radially symmetric pattern of pillar diameters focusing blue optical radiation, according to one embodiment. Again, using a metalens scaled from 4 mm to 100 micrometers with a scaled effective focal length of 33 micrometers is simulated, resulting in a spot size of 75 micrometers with a normalized efficiency of approximately 93%.

Figure 7A:
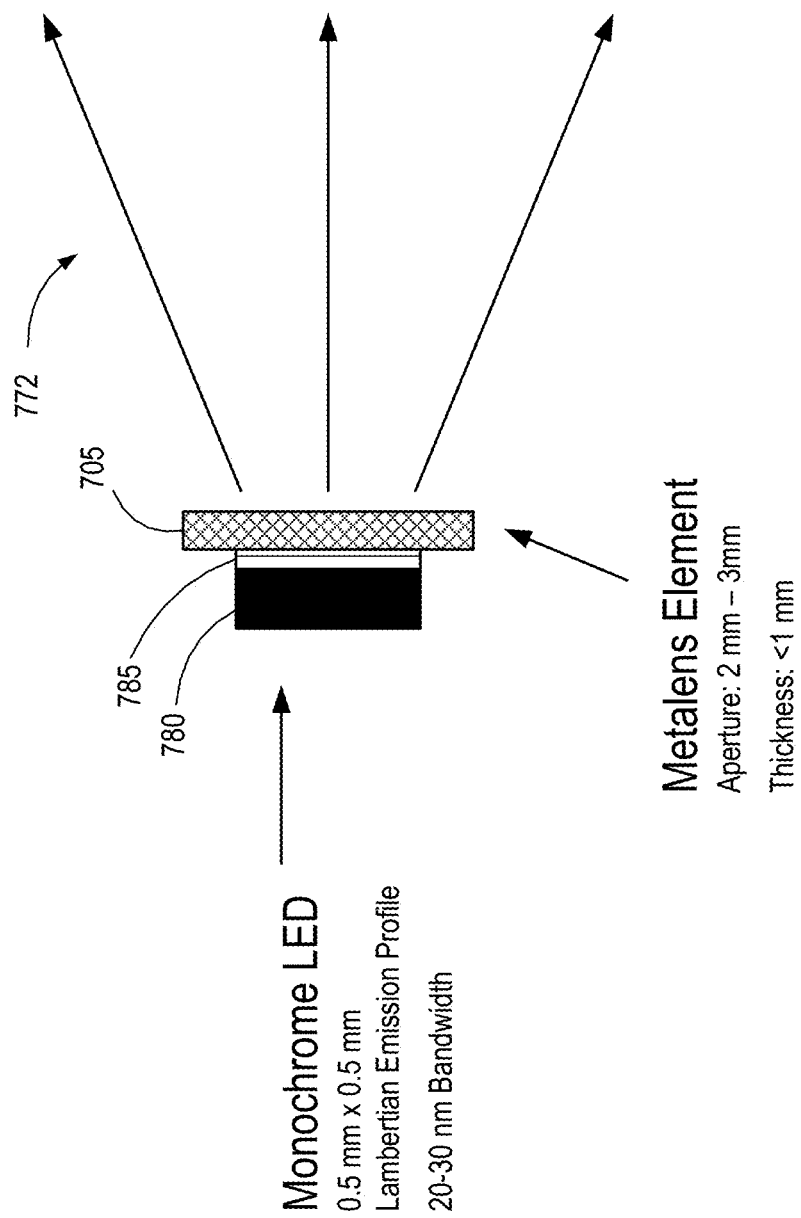
FIG. 7A illustrates a condenser metalens of titanium dioxide pillars mounted to an LED, according to one embodiment.

FIG. 7A illustrates a concentrator metalens 705 of titanium dioxide pillars mounted to an LED 780, according to one embodiment. In contrast to the embodiment illustrated and described in conjunction with FIG. 3C, the metalens 705 does not focus the optical radiation to a point. Rather, the metalens 705 operates as a condenser to condense the emitted optical radiation of a monochrome LED 780. The monochrome LED 780 has a divergent emission profile, such as a Lambertian emission profile. The optical radiation 772 transmitted or emitted out of the metalens 705 has a modified profile that is more condensed or concentrated than the initial Lambertian emission profile. In some embodiments, the metalens 705 includes a distribution of pillars with diameters selected to condense and/or concentrate as much of the optical radiation as possible within approximately a 30-degree cone.

As previously described, the metalens 705 may comprise a plurality of pillars arranged in a radially symmetric pattern with diameters calculated, modeled, or simulated to attain the target deflection pattern. Pillars formed from titanium dioxide having the ranges of diameters described above for the respective wavelengths of LEDs may be utilized to form the metalens 705. The metalens 705 may be mounted directly on the protective window 785 of the LED 780, such that the spacing between the planar face of the monochrome LED 780 that emits the optical radiation and the metalens 705 corresponds not the thickness of the window 785 (e.g., a few hundred nanometers or a few microns, depending on the specific LED design). The metalens 705 may have approximately the same length and width as the LED 780 or have a larger length and width than the LED 780 (as illustrated as a square metalens with a side dimension between approximately 2 millimeters and 3 millimeters).

Figure 7B:
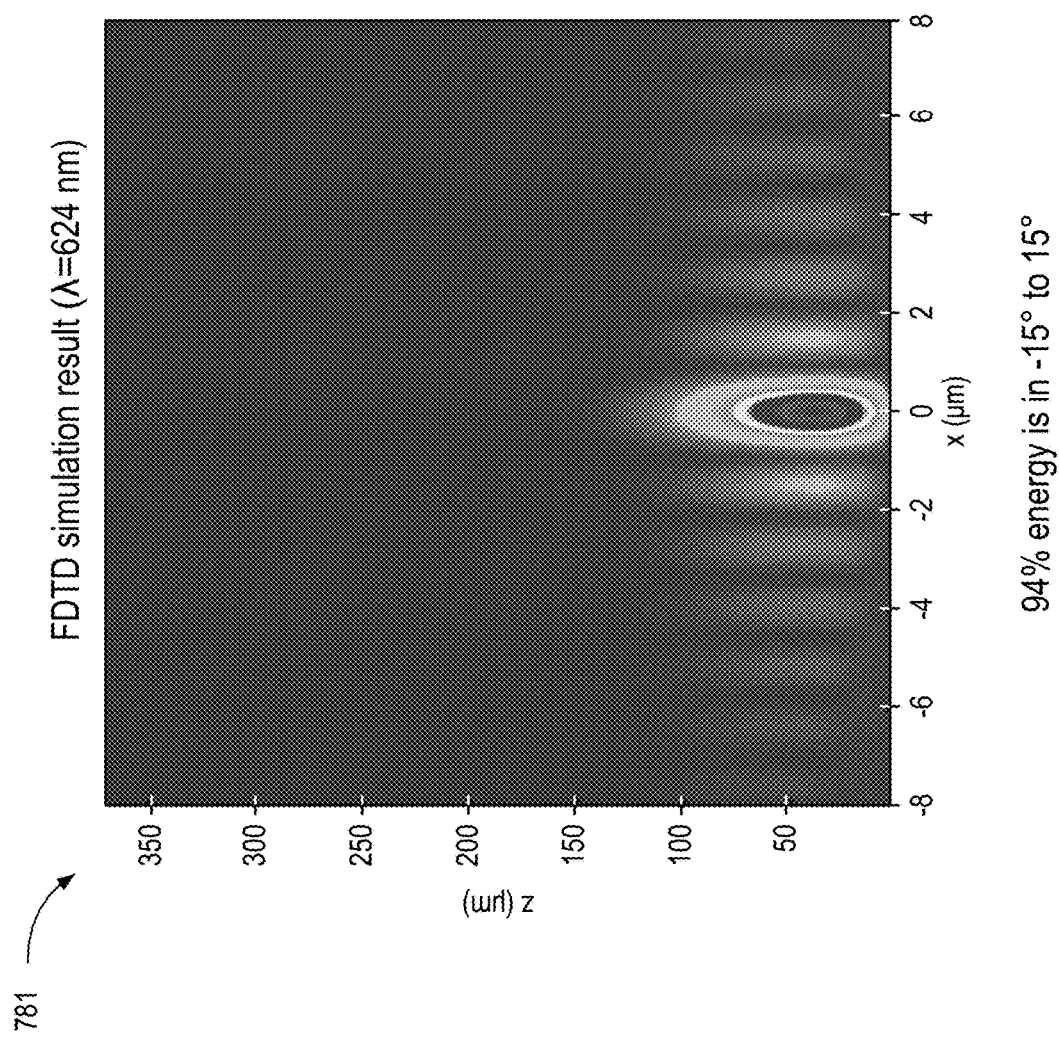
FIG. 7B illustrates an FDTD simulation of a titanium dioxide concentrator metalens mounted on a red LED, according to one embodiment.

FIG. 7B illustrates an FDTD simulation 781 of a titanium dioxide concentrator metalens mounted on a red LED, according to one embodiment. As illustrated, the LED-mounted metalens concentrates 94% (normalized) of the 624-nanometer optical radiation within approximately a 30-degree cone.

Figures 7C, 7D:
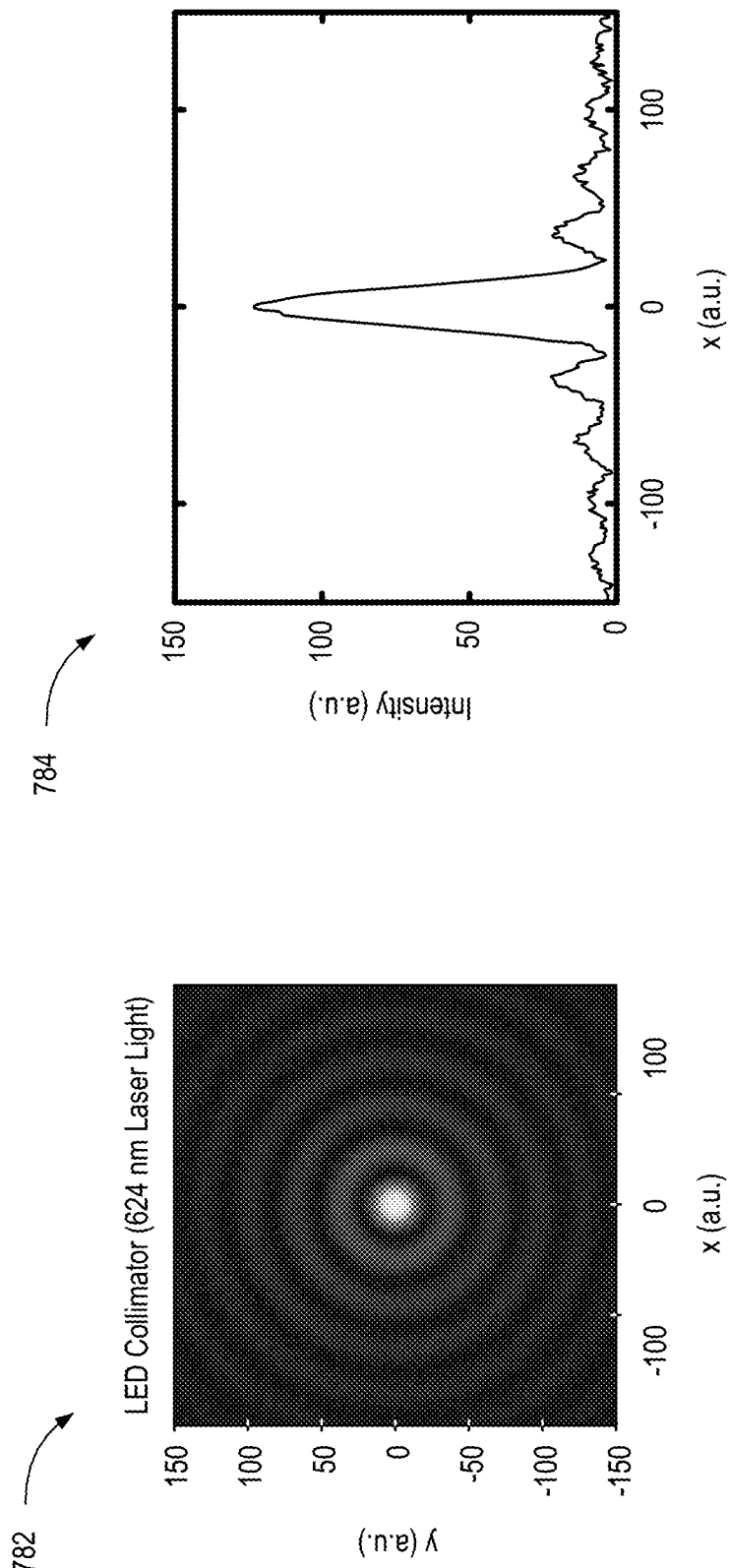
FIG. 7C illustrates a two-dimensional representation of the operation of a free space collimator metalens evaluated with red laser light, according to one embodiment.
FIG. 7D illustrates a graph of the intensity of the free space collimator metalens of FIG. 7C, according to one embodiment.

FIG. 7C illustrates a two-dimensional representation 782 of the operation of a free space collimator metalens evaluated with red laser light, according to one embodiment.

FIG. 7D illustrates a graph 784 of the intensity of the free space collimator metalens of FIG. 7C, according to one embodiment.

Figures 7E, 7F:
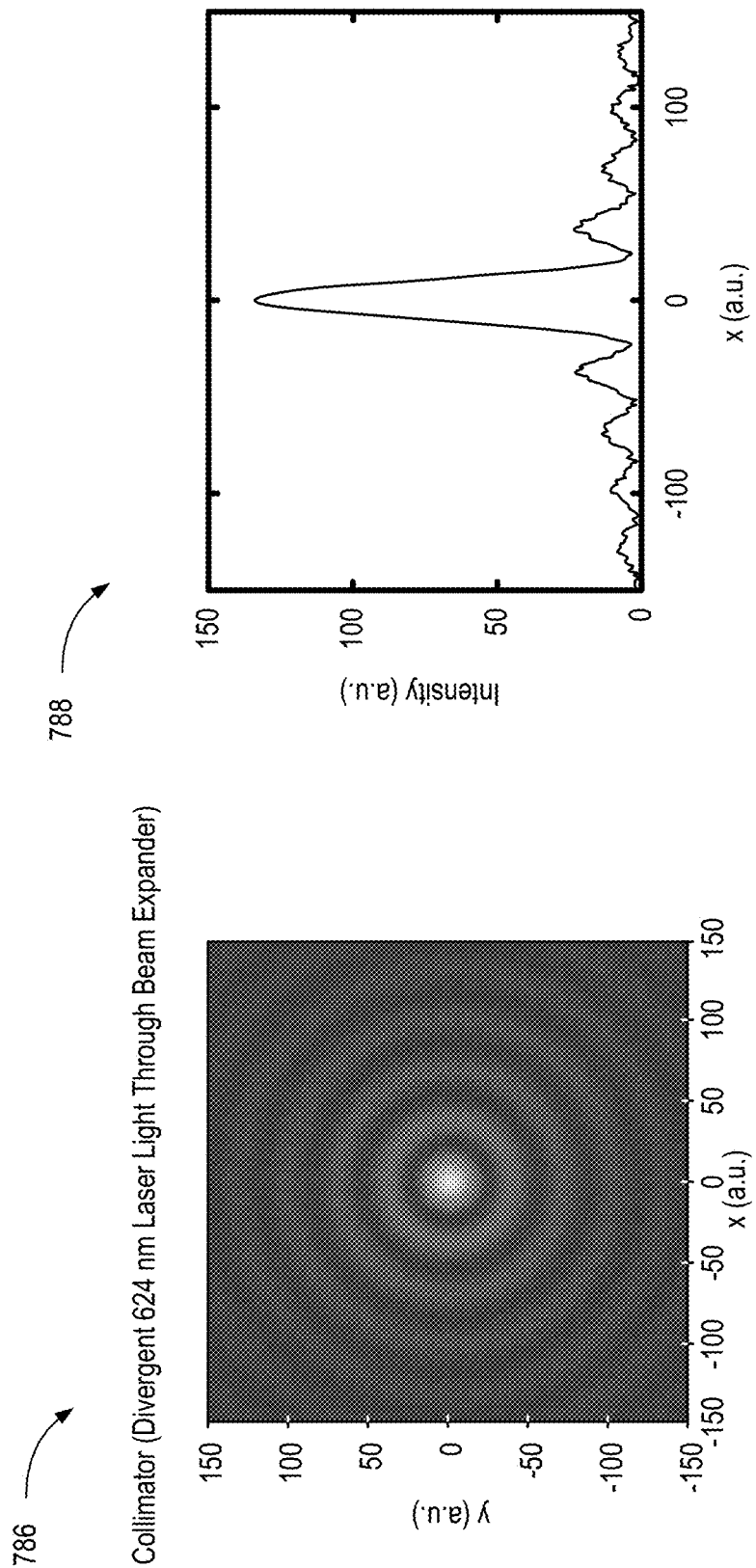
FIG. 7E illustrates a two-dimensional representation of the operation of a free space collimator metalens evaluated with red laser light passed through a beam expander, according to one embodiment.
FIG. 7F illustrates a graph of the intensity of the free space collimator metalens of FIG. 7E, according to one embodiment.

FIG. 7E illustrates a two-dimensional representation 786 of the operation of a free space collimator metalens evaluated with red laser light passed through a beam expander, according to one embodiment.

FIG. 7F illustrates a graph 788 of the intensity of the free space collimator metalens of FIG. 7E, according to one embodiment.

Figure 7G:
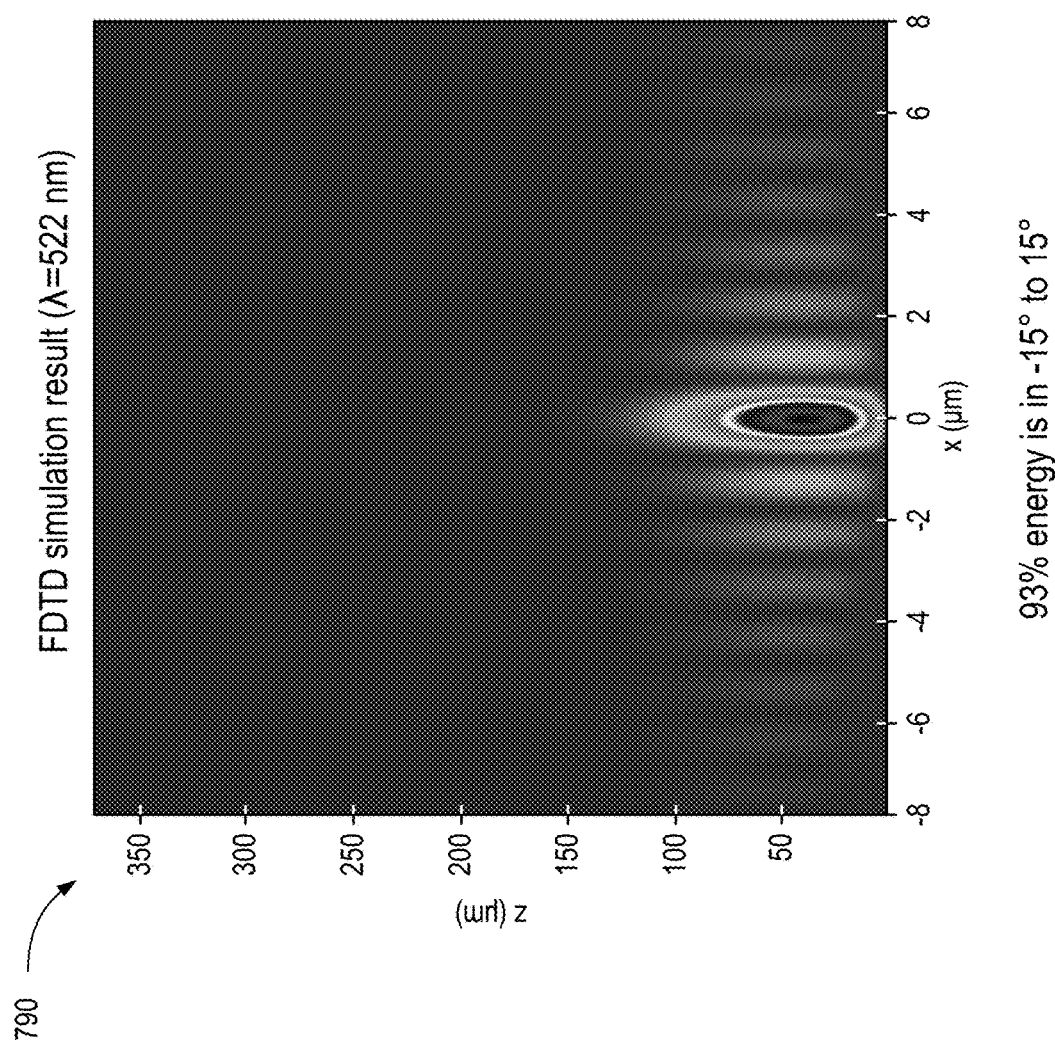
FIG. 7G illustrates an FDTD simulation of a titanium dioxide concentrator metalens mounted on a green LED, according to one embodiment.

FIG. 7G illustrates an FDTD simulation 790 of a titanium dioxide concentrator metalens mounted on a green LED, according to one embodiment. As illustrated, the LED-mounted metalens concentrates 93% (normalized) of the 522-nanometer optical radiation within approximately a 30-degree cone.

FIG. 7H illustrates an FDTD simulation 792 of a titanium dioxide concentrator metalens mounted on a blue LED, according to one embodiment. As illustrated, the LED-mounted metalens concentrates 91% (normalized) of the 455-nanometer optical radiation within approximately a 30-degree cone.

Figure 8A:
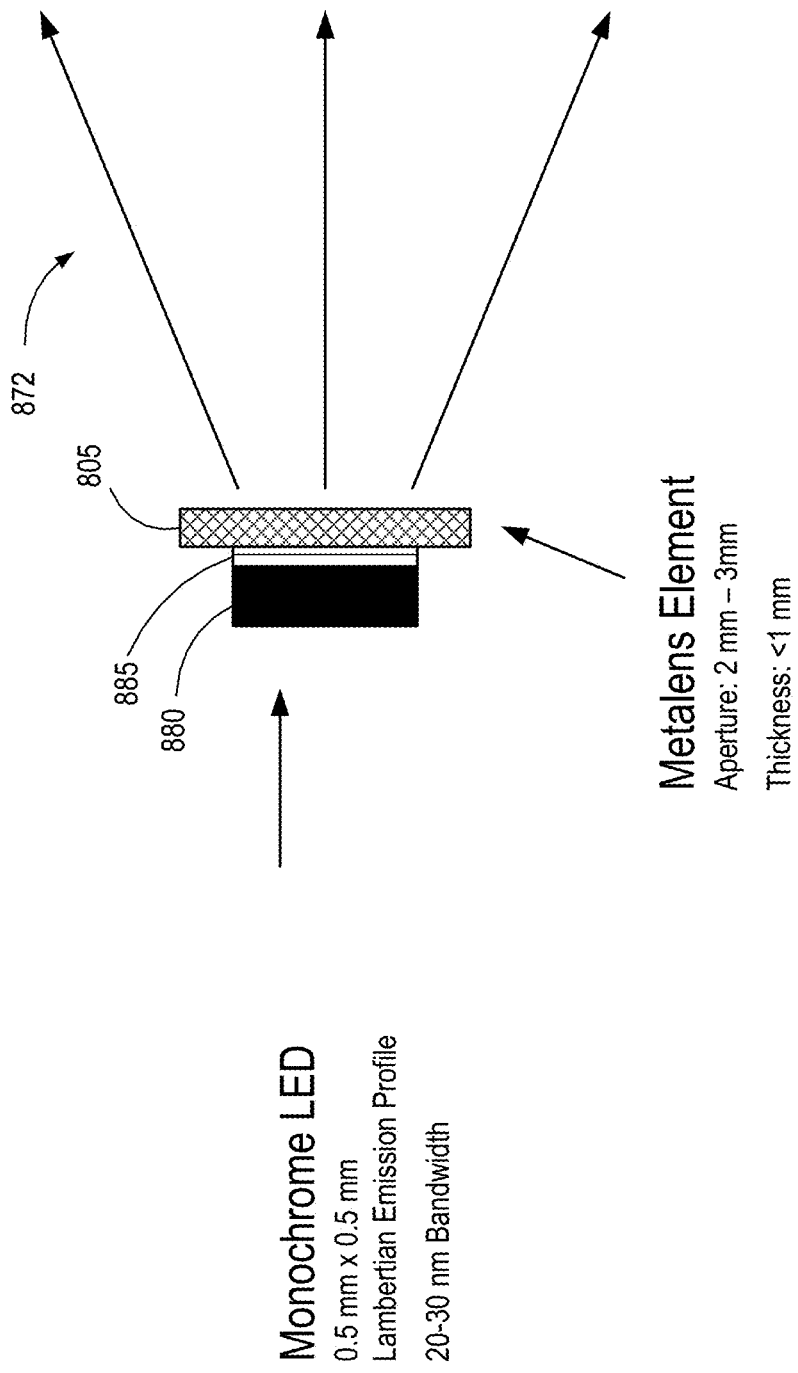
FIG. 8A illustrates a condenser metalens of polysilicon pillars mounted to an LED, according to one embodiment.

FIG. 8A illustrates a condenser metalens 805 of polysilicon (poly-Si) pillars mounted to an LED, according to one embodiment. Again, the metalens 805 operates to condense (e.g., concentrate) the Lambertian emission profile of optical radiation emitted by a monochrome LED 880 so that the output optical radiation 872 has a modified emission profile that is more concentrated. The metalens 805 may include a distribution of pillars with diameters selected to condense as much of the optical radiation as possible within approximately a 30-degree cone. The metalens 805 may be modified to condense the optical radiation within wider cone (e.g., a 45-degree cone) or a narrower cone (e.g., a 15-degree cone).

As previously described, the metalens 805 may comprise a plurality of pillars arranged in a radially symmetric pattern with diameters calculated, modeled, or simulated to attain the target deflection pattern. Pillars formed from polysilicon having the ranges of diameters described below in conjunction with FIGS. 8B-8D for the respective wavelengths of LEDs may be utilized to form the metalens 805 that is mounted directly on the LED or placed in very close proximity, such as mounted or fabricated directly on a transparent window 885 of the LED 880.

Figure 8C:
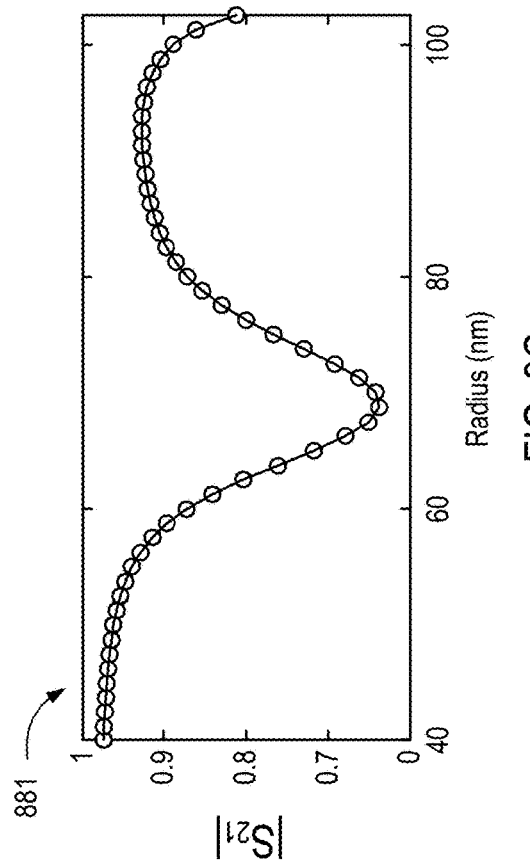
FIG. 8C illustrates a graph of the transmission efficiency of red optical radiation for polysilicon pillars having various radii, according to one embodiment.
Figure 8D:
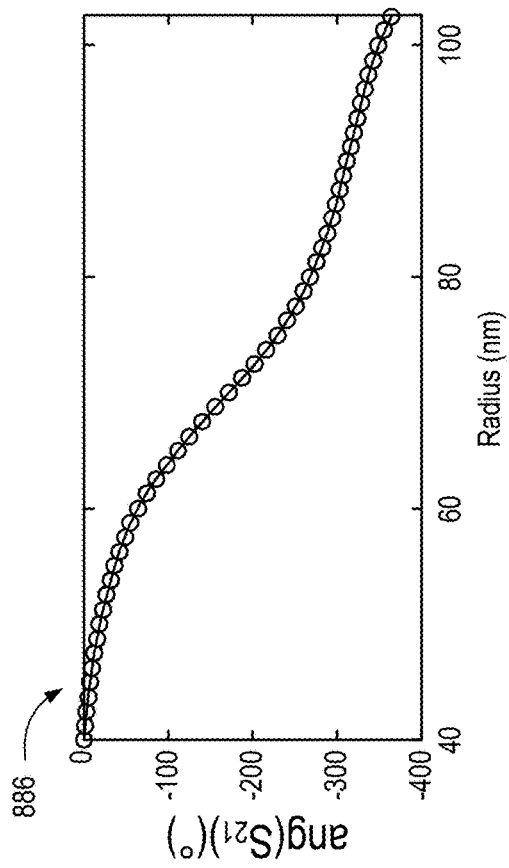
FIG. 8D illustrates a graph of the phase shift of red optical radiation associated with polysilicon pillars having various radii, according to one embodiment.
Figure 8B:
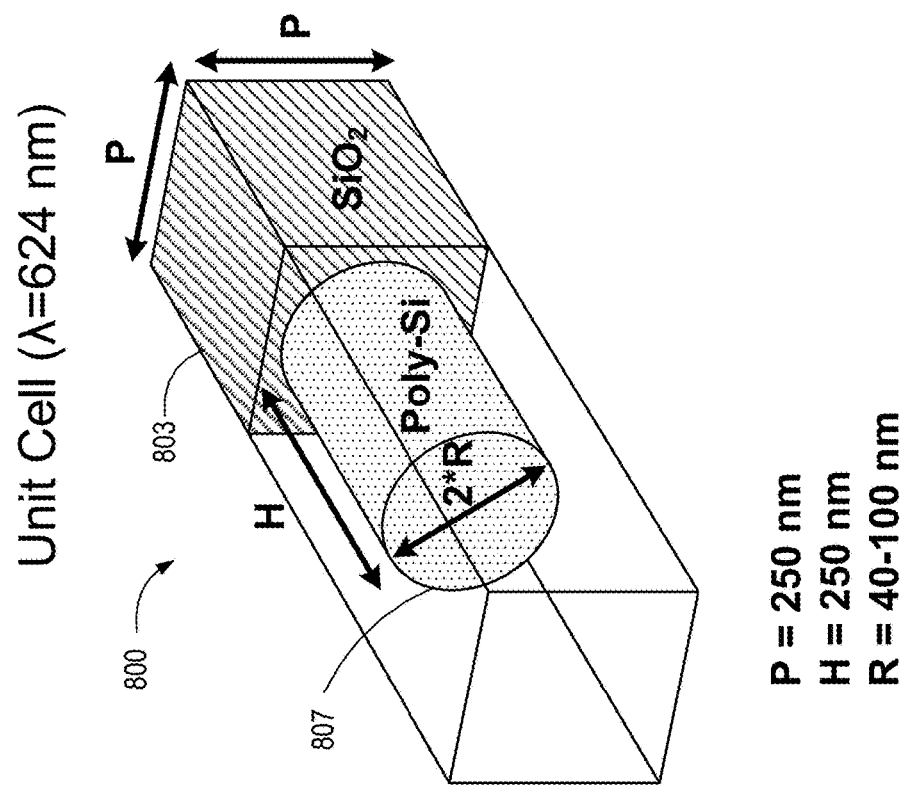
FIG. 8B illustrates an example of a unit cell of a polysilicon concentrator metalens for red optical radiation, according to one embodiment.

FIG. 8B illustrates an example of a unit cell 800 of a polysilicon concentrator metalens for red optical radiation, according to one embodiment. As illustrated, a polysilicon pillar 807 extends from a silicon dioxide (SiO$_2$) substrate 803. The unit cell 800 is square with a width of approximately 250 nanometers that corresponds to an example on-center interelement spacing of an array of unit cells 800 forming a metalens. The pillar 807, or cylindrical deflector element, extends from the silicon dioxide substrate 803 with a height of approximately 250 nanometers.

A metalens formed to condense red optical radiation may include a radially symmetric pattern of polysilicon unit cells 800 with pillars 807 that have diameters ranging from approximately 80 nanometers to 200 nanometers (radii ranging from 40 nanometers to 100 nanometers) to attain phase shifts exceeding a 2π range.

FIG. 8C illustrates a graph 881 of the transmission efficiency of red optical radiation at 624 nanometers (with a 20-30 nanometer bandwidth) for polysilicon pillars having radii between approximately 40 nanometers and 100 nanometers.

FIG. 8D illustrates a graph 886 of the phase shift of red optical radiation associated with polysilicon pillars having radii between approximately 40 nanometers and 100 nanometers.

Figure 8E:
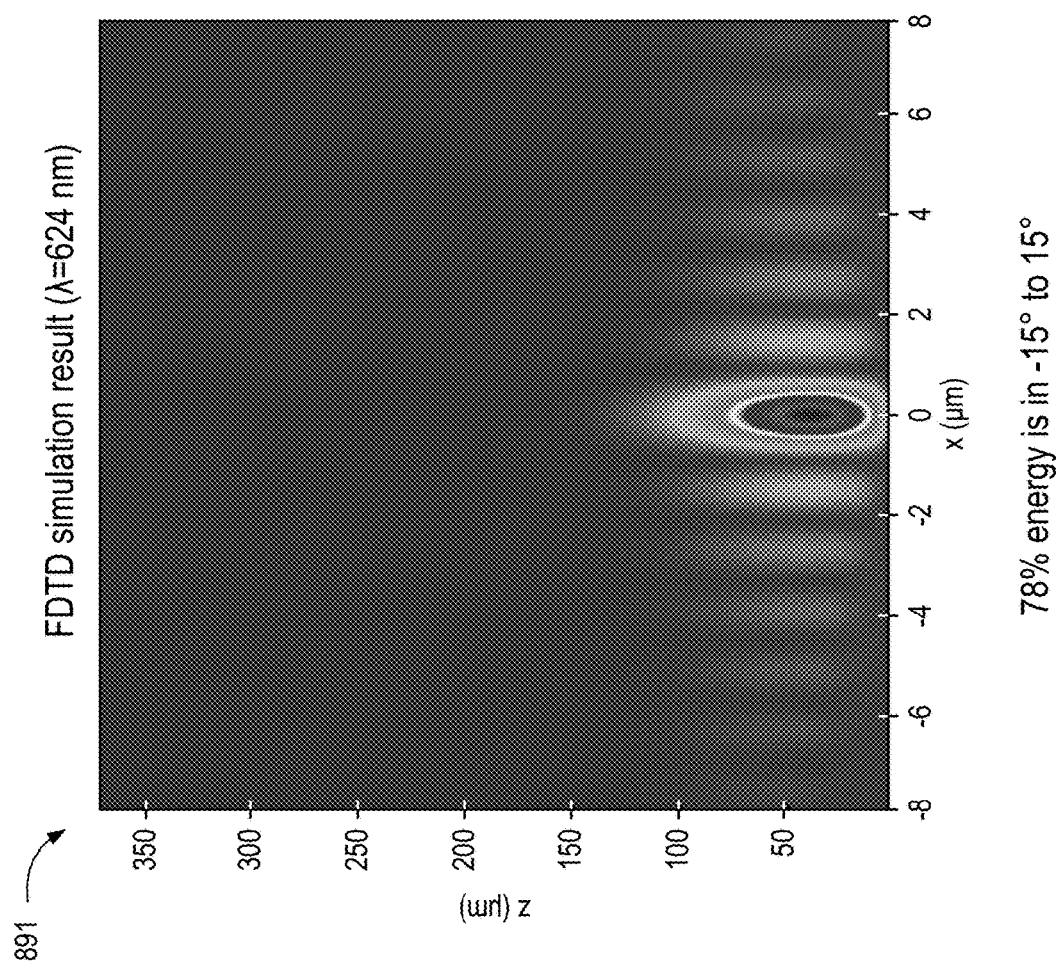
FIG. 8E illustrates an FDTD simulation of concentrated red optical radiation by a metalens with polysilicon pillars mounted to a red LED, according to one embodiment.

FIG. 8E illustrates an FDTD simulation 891 of a metalens with a radially symmetric pattern of polysilicon pillars with diameters selected to condense red optical radiation, according to one embodiment. As illustrated, the LED-mounted polysilicon metalens condenses 78% (normalized) of the 624-nanometer optical radiation within a cone. The polysilicon metalens uses pillars with a height of 250 nanometers (shorter than the height of 600 nanometers used for the height of the titanium dioxide pillars) that may result in a thinner metalens. However, according to the simulation, the normalized concentration efficiency of the polysilicon metalens (78%) is lower than the normalized concentration efficiency of the simulated titanium dioxide metalens (compare with FIG. 7B).

Figure 8G:
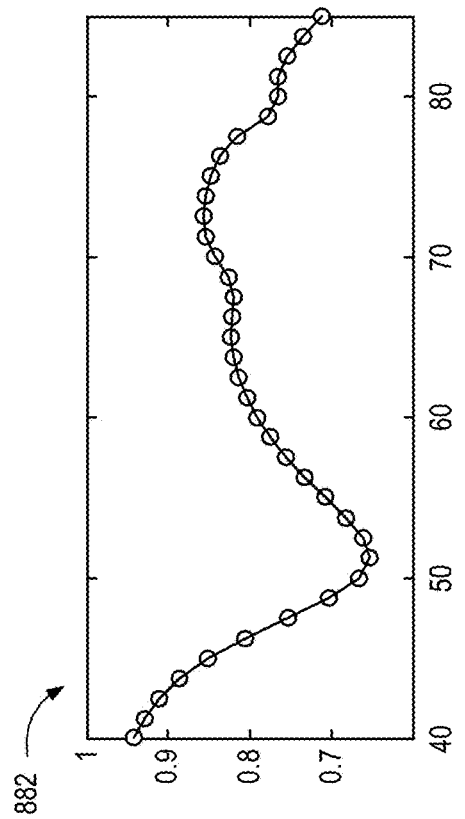
FIG. 8G illustrates a graph of the transmission efficiency of green optical radiation for polysilicon pillars having various radii, according to one embodiment.
Figure 8H:
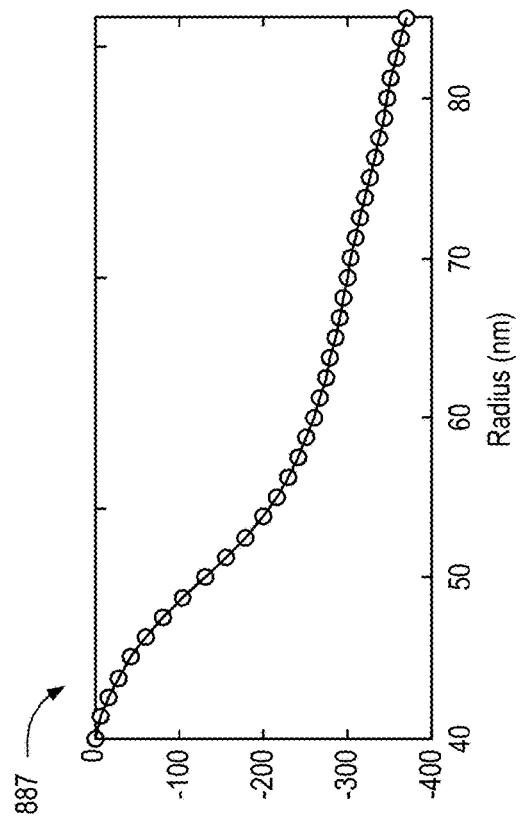
FIG. 8H illustrates a graph of the phase shift of green optical radiation associated with polysilicon pillars having various radii, according to one embodiment.
Figure 8F:
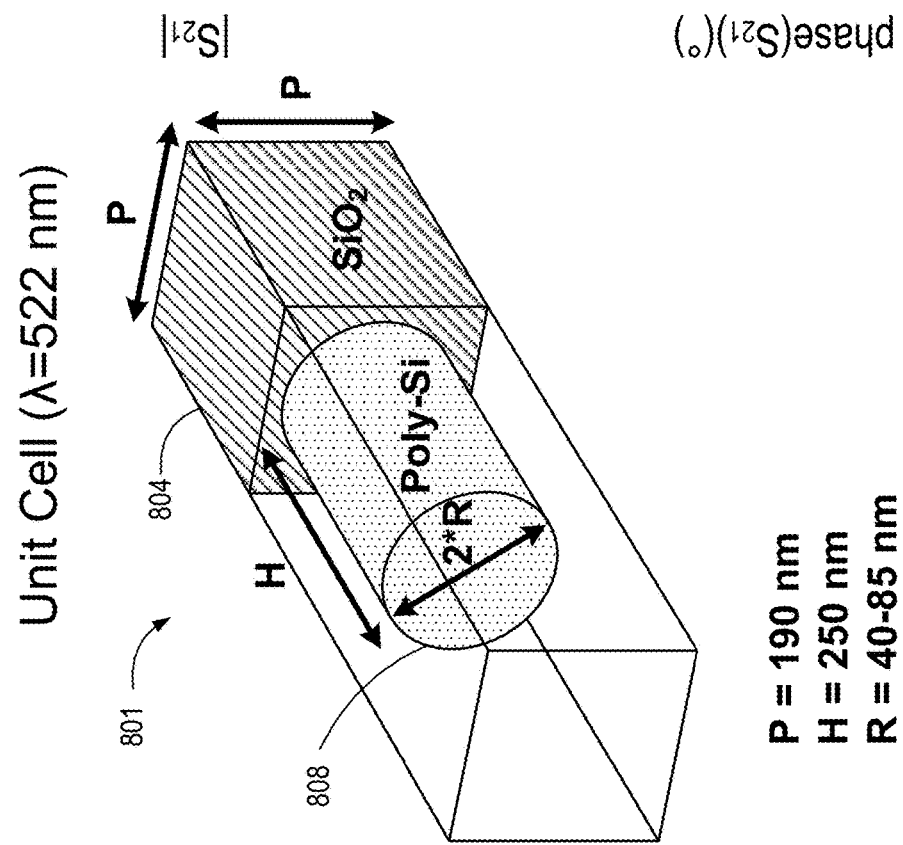
FIG. 8F illustrates an example of a unit cell of a polysilicon concentrator metalens for green optical radiation, according to one embodiment.

FIG. 8F illustrates an example of a unit cell 801 of a polysilicon concentrator metalens for green optical radiation, according to one embodiment. As illustrated, a polysilicon pillar 808 extends from a silicon dioxide ($SiO_2$) substrate 804. The unit cell 801 is square with a width of approximately 190 nanometers, which corresponds to an example on-center interelement spacing of an array of unit cells 801 forming a metalens. The pillar 808, or cylindrical deflector element, extends from the silicon dioxide substrate 804 with a height of approximately 250 nanometers.

A metalens formed to condense green optical radiation may include a radially symmetric pattern of polysilicon unit cells 801 with pillars 808 that have diameters ranging from approximately 80 nanometers to 170 nanometers (radii ranging from 40 nanometers to 85 nanometers) to attain phase shifts exceeding a 2π range.

FIG. 8G illustrates a graph 882 of the transmission efficiency of green optical radiation at 522 nanometers (with a 20-30 nanometer bandwidth) for polysilicon pillars having radii between approximately 40 nanometers and 85 nanometers.

FIG. 8H illustrates a graph 887 of the phase shift of green optical radiation associated with polysilicon pillars having radii between approximately 40 nanometers and nanometers.

Figure 8I:
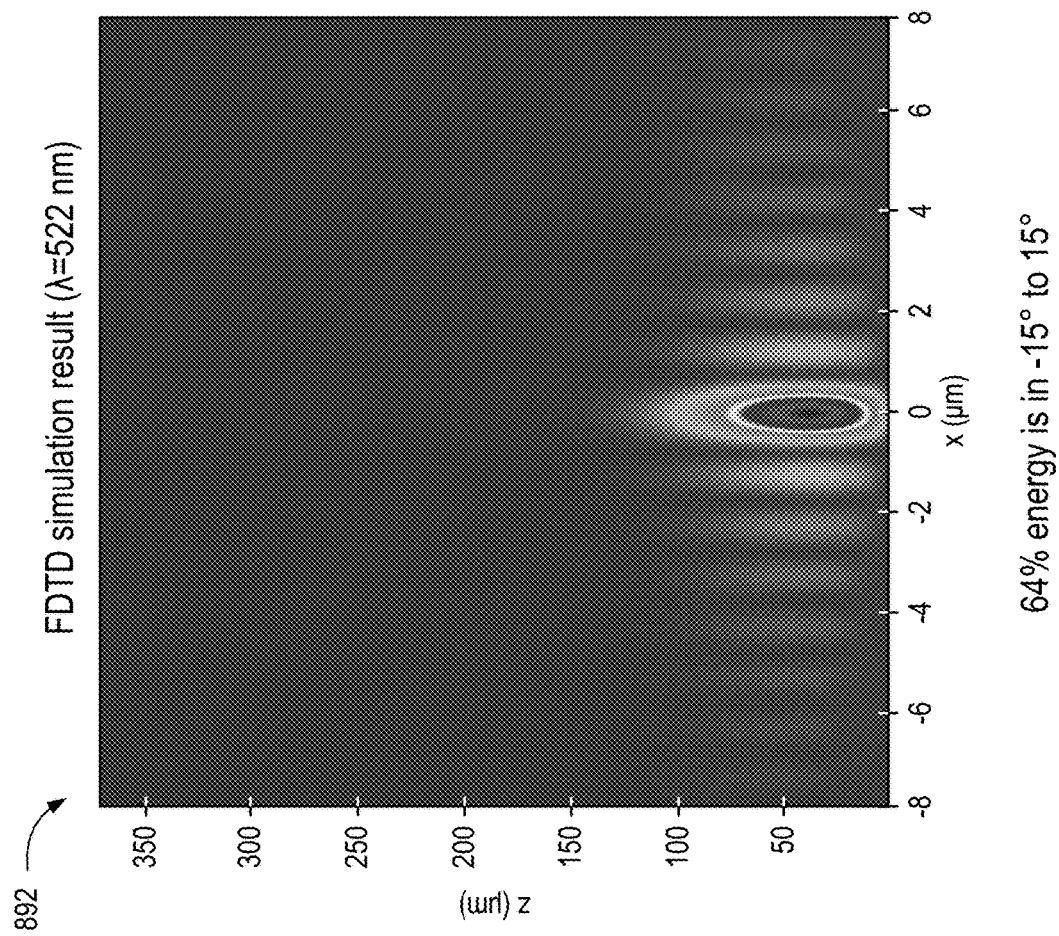
FIG. 8I illustrates an FDTD simulation of concentrated green optical radiation by a metalens with polysilicon pillars mounted to a green LED, according to one embodiment.

FIG. 8I illustrates an FDTD simulation 892 of concentrated green optical radiation by a metalens with polysilicon pillars mounted to a green LED, according to one embodiment. As illustrated, the LED-mounted polysilicon metalens concentrates 64% (normalized) of the 522-nanometer optical radiation within approximately a 30-degree cone.

Figure 8K:
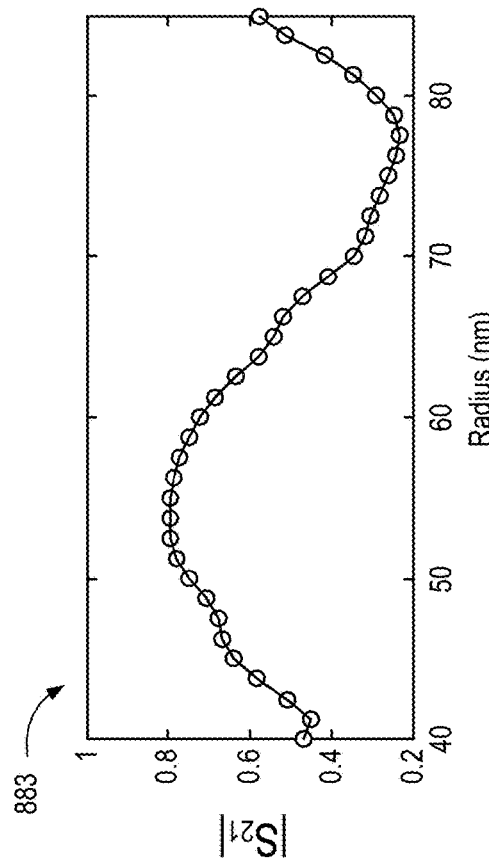
FIG. 8K illustrates a graph of the transmission efficiency of blue optical radiation for polysilicon pillars having various radii, according to one embodiment.
Figure 8L:
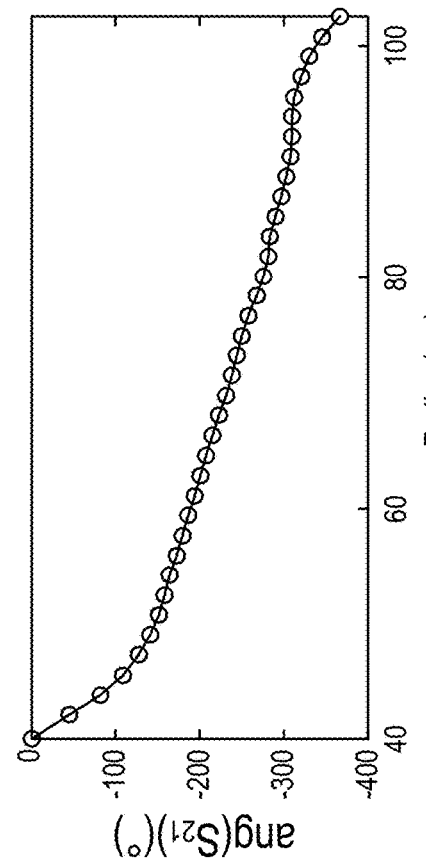
FIG. 8L illustrates a graph of the phase shift of blue optical radiation associated with polysilicon pillars having various radii, according to one embodiment.
Figure 8J:
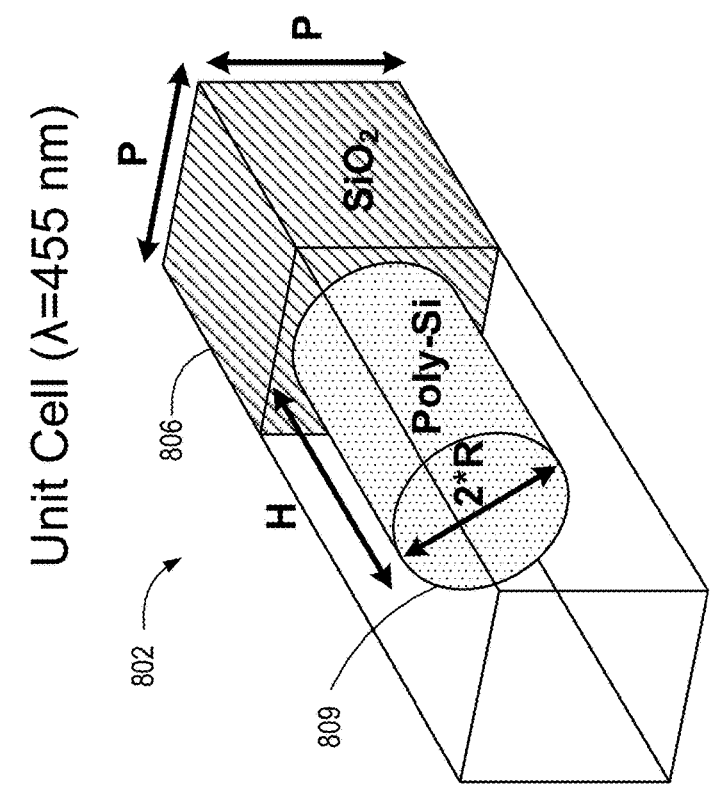
FIG. 8J illustrates an example of a unit cell of a polysilicon concentrator metalens for blue optical radiation, according to one embodiment.

FIG. 8J illustrates an example of a unit cell 802 of a polysilicon concentrator metalens for blue optical radiation, according to one embodiment. As illustrated, a polysilicon pillar 809 extends from a silicon dioxide ($SiO_2$) substrate 806. The unit cell 802 is square with a width of approximately 180 nanometers that corresponds to an example on-center interelement spacing of an array of unit cells 802 forming a metalens. The pillar 809, or cylindrical deflector element, extends from the silicon dioxide substrate 806 with a height of approximately 250 nanometers.

A metalens formed to condense blue optical radiation may include a radially symmetric pattern of polysilicon unit cells 802 with pillars 809 that have diameters ranging from approximately 80 nanometers to 170 nanometers (radii ranging from 40 nanometers to 85 nanometers) to attain phase shifts exceeding a 2π range.

FIG. 8K illustrates a graph 883 of the transmission efficiency of blue optical radiation at 455 nanometers (with a 20-30 nanometer bandwidth) for polysilicon pillars having radii between approximately 40 nanometers and 85 nanometers.

FIG. 8L illustrates a graph 888 of the phase shift of blue optical radiation associated with polysilicon pillars having radii between approximately 40 nanometers and nanometers.

Figure 8M:
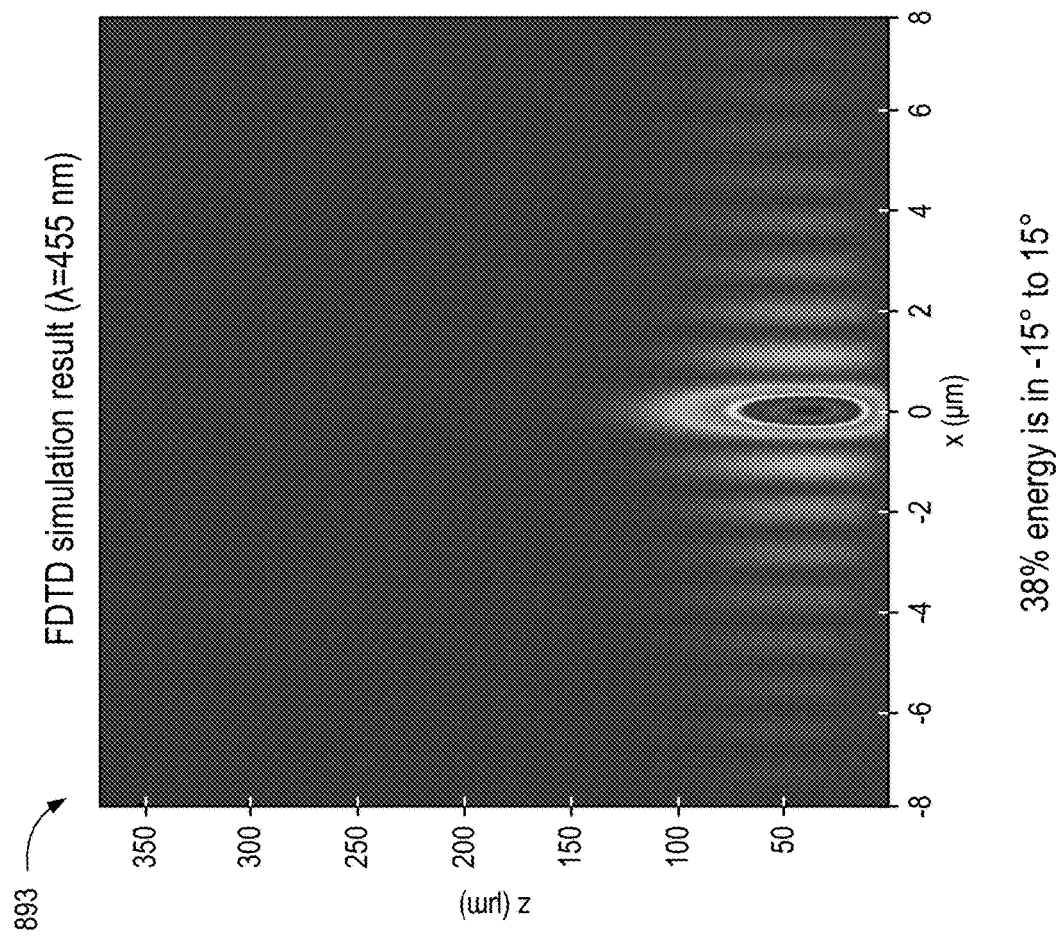
FIG. 8M illustrates an FDTD simulation of concentrated blue optical radiation by a metalens with polysilicon pillars mounted to a blue LED, according to one embodiment.

FIG. 8M illustrates an FDTD simulation 893 of concentrated blue optical radiation by a metalens with polysilicon pillars mounted to a blue LED, according to one embodiment. As illustrated, the LED-mounted polysilicon metalens concentrates 38% (normalized) of the 455-nanometer optical radiation within approximately a 30-degree cone.

Figures 9A, 9B, 9C:
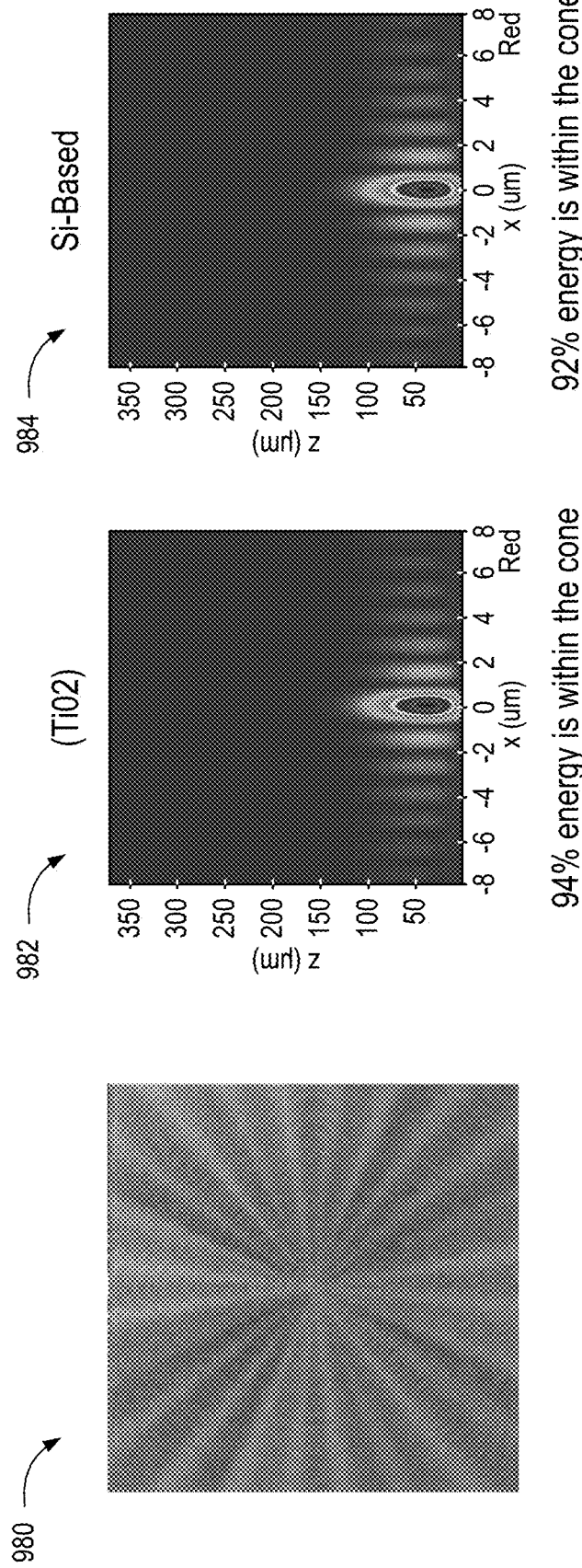
FIG. 9A illustrates an example corrector metalens with a radially symmetric pattern of pillar diameters, according to one embodiment.
FIG. 9B illustrates a graph of the energy focus for red optical radiation using titanium dioxide pillars, according to one embodiment.
FIG. 9C illustrates a graph of the energy focus for red optical radiation using polysilicon pillars, according to one embodiment.

FIG. 9A illustrates an example LED corrector metalens 980 with a radially symmetric pattern of pillar diameters, according to one embodiment. The LED corrector metalens 980 may be paired with an underlying LED that emits optical radiation with a divergent emission profile (e.g., such as a Lambertian emission profile, butterfly wing emission profile, batwing emission profile, uniform low angle emission profile, uniform broad angle emission profile, elliptical emission profile, etc.). The corrector metalens 980 may operate to, for example, receive the optical radiation emitted by the underlying LED with the divergent emission profile and operate to modify the optical radiation to have a modified transmission profile. As such, the optical radiation emitted from the metalens has a modified transmission profile that may be, for example, a collimated transmission profile, a concentrated transmission profile, a condensed transmission profile, a wider transmission profile, a more uniform transmission profile, a split beam transmission profile, and/or a combination thereof. As described herein, the pillars or other deflector elements forming the metalens may be manufactured using titanium dioxide, polysilicon, amorphous silicon, hydrogenated amorphous silicon (a-H-Silicon), silicon nitride, silicon rich nitride, hydrogenated silicon rich nitride, and/or a combination thereof.

FIG. 9B illustrates a graph 982 of the energy focus for red optical radiation using titanium dioxide pillars, according to one embodiment.

FIG. 9C illustrates a graph 984 of the energy focus for red optical radiation using polysilicon pillars, according to one embodiment.

FIG. 10A illustrates a block diagram of an LED 1080 with planar face 1082 from which optical radiation 1085 is emitted with a Lambertian emission profile, as exemplified by graph 1086.

FIG. 10B illustrates a block diagram of the LED 1080 with a metalens 1005 positioned in planar alignment with planar face 1082 of the LED 1080. The metalens 1005 is configured to collimate and/or condense the optical radiation from the LED 1080 into a modified transmission profile 1095. The graph 1096 illustrates an example modified transmission profile.

Figure 11A:
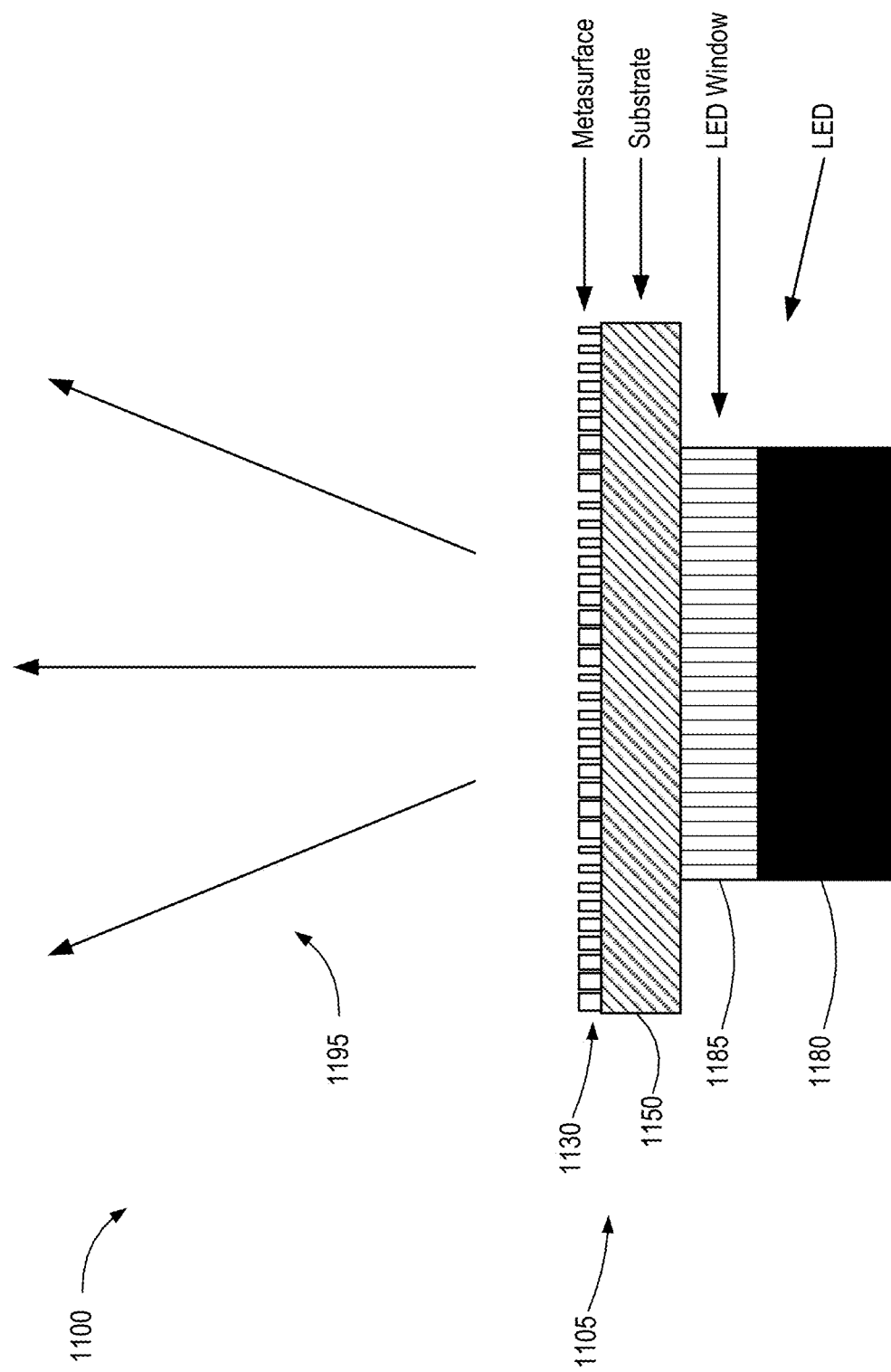
FIG. 11A illustrates a block diagram of a metalens for an LED, according to one embodiment.

FIG. 11A illustrates a block diagram of a metalens 1105 for an LED 1180, according to one embodiment. As illustrated and described in conjunction with other embodiments, the metalens 1105 includes a substrate 1150 and a two-dimensional array of passive pillars 1130 that extend from the substrate away from the LED 1180. In the illustrated view, only a single line of the passive pillars 1130 is visible. However, it is understood that the metalens 1105 may be circular, rectangular, square, have an irregular shape, or be an N-sided polygon. The two-dimensional array of passive pillars 1130 extends from the substrate with a repeating pattern of varying diameters and on-center spacings to create a target phase gradient for an operational bandwidth. An example of a linearly symmetric pattern of pillar diameters with uniform on-center interelement spacing (subwavelength) is illustrated in FIG. 2B. An example of a radially symmetric pattern of pillar diameters with uniform, subwavelength, on-center interelement spacing is illustrated and described in conjunction with FIGS. 15A-15D.

As illustrated, the LED 1180 has an integrated window layer 1185 that operates to protect the LED and/or modify the emission profile of the optical radiation generated by the LED 1180. The optical radiation emitted from the surface of the LED 1180 and/or from the surface of the window layer 1185 may be approximated as a Lambertian emission profile or another divergent emission profile. The metalens 1105 may be positioned directly on the window layer 1185 in a standard configuration in which the substrate 1150 is positioned (e.g., mounted, fused, glued, connected, mechanically secured, etc.) adjacent to the window layer 1185. As such, the optical radiation from the LED 1180 travels through the window layer 1185 and the (transparent or transmissive) substrate 1150 before being modified by the passive pillars 1130 of the metasurface comprising the two-dimensional array of passive pillars. The two-dimensional array of passive pillars may, for example, include a radially symmetric pattern of varying pillar diameters. The combination of the LED 1180 and the metalens 1105 may be used as or referred to as an optical assembly or optical device 1100.

The diameter of each individual pillar is selected as a function of the operational wavelength or wavelength band of the LED 1180 (e.g., a relatively narrow bandwidth from a monochrome LED) such that the passive pillars 1130 of the metasurface provide a target phase gradient (a two-dimensional phase gradient) on the surface of the substrate 1150. The two-dimensional phase gradient formed by the passive pillars 1130 of the metasurface operates to modify the divergent emission profile of the optical radiation from the LED 1180 to have a modified transmission profile. Optical radiation 1195 with the modified transmission profile is emitted or transmitted that may have, for example, a condensed profile, a collimated profile, a concentrated profile, a focused profile, etc.

FIG. 11B illustrates geometric calculations associated with the metalens of FIG. 11A, according to one embodiment. As illustrated, optical radiation from the LED 1180 is emitted through the window layer (not shown) and the substrate 1150 before passing through the passive pillars 1130. The passive pillars 1130 modify the incident optical radiation to have a modified transmission profile with a modified angle of divergence, $\theta_m$, from a centerline. Calculations 1125 illustrate the calculation of the radius of the metasurface, $r_M$, as a function of the radius of the planar emitting face, $r_L$, of the LED 1180, the maximum angle of divergence, $\theta L$, of the optical radiation emitted by the LED 1180 that will interact with the metasurface, and the total distance between the planar emitting face, $r_L$, of the LED 1180 and the metasurface of the metalens. The total distance between the planar emitting face, $r_L$, of the LED 1180 and the metasurface of the metalens is equal to the sum of the thickness of the substrate, $t_s$, and the gap, $\delta$, between the LED 1180 and the substrate 1150. In the embodiment illustrated in FIG. 11A, where the substrate 1150 is mounted directly to the window layer 1185, the total distance between the planar emitting face, $r_L$, of the LED 1180 and the metasurface of the metalens is equal to the sum of the thickness of the substrate, $t_s$, and the thickness of the window layer 1185.

FIG. 11C illustrates a table 1127 of example metasurface radius values, $r_M$, calculated for various angles of divergence values, $\theta_L$, for an LED having a radius of 0.25 millimeters. As illustrated, the thickness of the substrate, $t_s$, (0.5 mm) and the thickness of window layer, $\delta$, (0.1 mm) have a significant impact on the radius of the metasurface, $r_M$. As illustrated, even for a 70° maximum angle of divergence, the radius of the metasurface, $r_M$, is more than 7.5 times as large as the radius of the LED, $r_L$. With an 85° maximum angle of divergence, the radius of the metasurface, $r_M$, is more than 28 times as large as the radius of the LED, $r_L$.

Figure 12A:
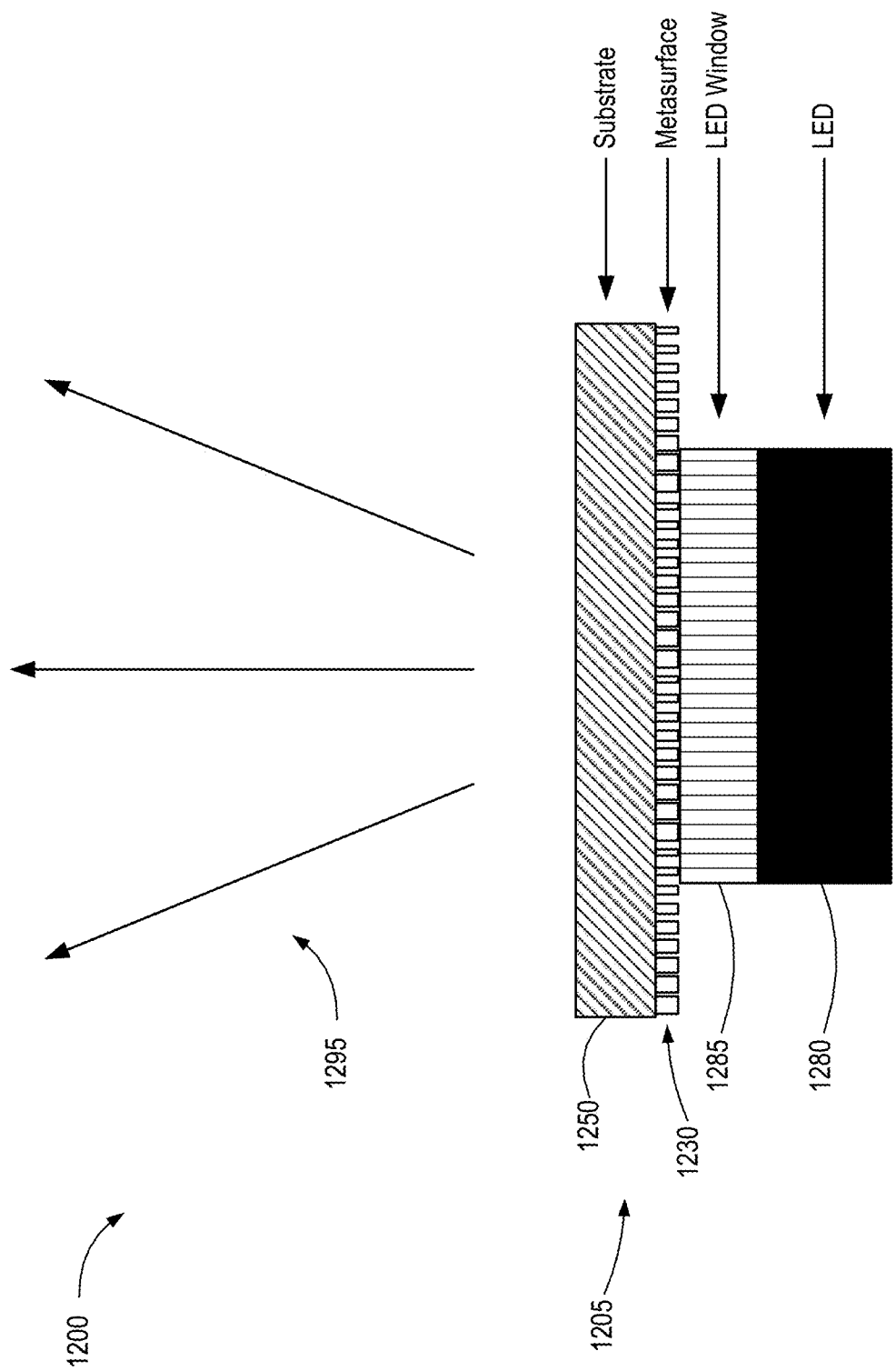
FIG. 12A illustrates a block diagram of an inverted metalens for an LED, according to one embodiment.

FIG. 12A illustrates a block diagram of an inverted metalens 1205 for an LED, according to one embodiment. As illustrated and described in conjunction with other embodiments, the metalens 1205 includes a substrate 1250 and a two-dimensional array of passive pillars 1230 that extend from the substrate. Again, the metalens 1205 may be circular, rectangular, square, have an irregular shape, or be an N-sided polygon. The two-dimensional array of passive pillars 1230 extends from the substrate with a repeating pattern of varying diameters and on-center spacings to create a target phase gradient for an operational bandwidth.

As illustrated, the LED 1280 has an integrated window layer 1285 that operates to protect the LED and/or modify the emission profile of the optical radiation generated by the LED 1180. The optical radiation emitted from the surface of the LED 1280 and/or from the surface of the window layer 1285 may be approximated as a Lambertian emission profile or another divergent emission profile. The metalens 1105 may be positioned directly on the window layer 1285 in an inverted configuration in which the metasurface of passive pillars 1230 is positioned (e.g., mounted, fused, glued, connected, mechanically secured, etc.) adjacent to the window layer 1285. As such, the optical radiation from the LED 1180 travels through the window layer 1285, is modified by the metasurface of passive pillars 1230 and then passes through the (transparent or transmissive) substrate 1250. The two-dimensional array of passive pillars 1230 may, for example, include a radially symmetric pattern of varying pillar diameters. The combination of the LED 1280 and the metalens 1205 may be used as or referred to as an optical assembly or optical device 1200.

The diameter of each individual pillar is selected as a function of the operational wavelength of the LED 1280 (e.g., a narrow bandwidth from a monochrome LED) such that the metasurface of passive pillars 1230 provide a target phase gradient (a two-dimensional phase gradient) on the surface of the substrate 1250. The two-dimensional phase gradient formed by the passive pillars 1230 of the metasurface operates to modify the divergent emission profile of the optical radiation from the LED 1280 to have a modified transmission profile. Optical radiation 1295 with the modified transmission profile is emitted or transmitted that may have, for example, a condensed profile, a collimated profile, a concentrated profile, a focused profile, one or more deflected beams, etc.

FIG. 12B illustrates geometric calculations associated with the inverted metalens of FIG. 11A, according to one embodiment. As illustrated, optical radiation from the LED 1180 is emitted through the gap or window layer (not shown) before passing through the passive pillars 1230. The passive pillars 1230 modify the incident optical radiation to have a modified transmission profile with a modified angle of divergence, $\theta_m$, from a centerline. The optical radiation is modified by the passive pillars 1230 before passing through the substrate 1250. Calculations 1225 illustrate the calculation of the radius of the metasurface, $r_M$, as a function of the radius of the planar emitting face, $r_L$, of the LED 1280, the maximum angle of divergence, $\theta_L$, of the optical radiation emitted by the LED 1280 that will interact with the metasurface, and the total distance between the planar emitting face, $r_L$, of the LED 1280 and the metasurface. In the inverted configuration, the total distance between the planar emitting face, $r_L$, of the LED 1280 and the metasurface is equal to the thickness of the window layer and/or any gap, δ, between the LED 1280 and the metasurface. The thickness of the substrate is not a factor in the inverted configuration. In the embodiment illustrated in FIG. 12A, where the passive pillars 1230 are mounted directly to the window layer 1285, the total distance between the planar emitting face, $r_L$, of the LED 1280 and the metasurface (e.g., the passive pillars 1230) is equal to the thickness of the window layer 1285.

FIG. 12C illustrates a table 1227 of example inverted metasurface radius values, $r_M$, calculated for various angles of divergence values, $\theta_L$, for an LED having a radius of 0.25 millimeters. As illustrated, the thickness of the substrate, $t_s$, (0.5 mm) is not a factor. The thickness of window layer, δ, (0.1 mm) impacts the radius of the metasurface, $r_M$. As illustrated, for a 70° maximum angle of divergence, the radius of the metasurface, $r_M$, is approximately two times as large as the radius of the LED, $r_L$. With an maximum angle of divergence, the radius of the metasurface, $r_M$, is approximately 5.5 times as large as the radius of the LED, $r_L$. Decreasing the thickness of the window and/or removing the window layer can significantly decrease the relative size of the radius of the metasurface compared to the radius of the LED when the metalens is positioned in the inverted configuration.

FIG. 13A illustrates a block diagram of an LED 1380 with an inverted metalens with the metasurface of passive pillars 1330 applied to an LED surface, according to one embodiment. As illustrated, optical radiation from the LED 1380 is emitted with a divergent emission profile directly into the passive pillars 1330. In some embodiments, there is no gap between the passive pillars 1330 and the planar surface of the LED 1380. In other embodiments, a gap between 0 and 50 micrometers (0.05 millimeters) may be used to prevent damage to the passive pillars 1330 during positioning. In some embodiments, the passive pillars 1330 are encapsulated in a transparent medium, such as an optical adhesive to bond the metasurface elements (the passive pillars 1330) to the LED 1380. In some embodiments, the passive pillars 1330 may be manufactured directly on the top layer of the LED 1380. In some of the embodiments in which the passive pillars 1330 are manufactured directly on the top layer of the LED, the top layer of the LED 1380 serves as the "substrate" for the metalens, and the substrate 1350 may be omitted.

In the various embodiments described herein, the passive pillars 1330 modify the optical radiation 1395 to have a modified transmission profile. The optical radiation from the LED 1380 is modified by the passive pillars 1330 before passing through the substrate 1350. Using the same calculations used in conjunction with FIGS. 12B and 12C, a gap of 50 microns allows for an inverted metasurface radius value, $r_M$, of 0.38 mm for a 70° angle of divergence (1.5 times the radius of the LED), or 0.82 mm for an 85° angle of divergence (3.3 times the radius of the LED).

FIG. 13B illustrates a two-dimensional array 1375 of LEDs with inverted metalenses, according to one embodiment. As compared to FIG. 1B, the use of an inverted metalenses mounted directly on the planar surface of the LED, even with a very small gap (<100 microns), allows for a much higher fill factor of the metalenses with respect to the LEDs.

FIG. 14A illustrates a block diagram of an LED 1480 with an inverted metalens with a matched aperture applied to a planar surface of the LED 1480, according to one embodiment. Optical radiation from the LED 1480 is emitted with a divergent emission profile directly into the passive pillars 1430 for conversion to optical radiation 1495 with a modified transmission/emission profile. There is no gap between the planar surface of the LED 1480 and the passive pillars 1430. In some embodiments, the substrate 1450 may still be present as part of the metalens, and the passive pillars 1430 extend therefrom toward the planar surface of the LED 1480. In other embodiments, the passive pillars 1430 may be manufactured directly on the top layer of the LED 1480, such that the top layer of the LED 1480 serves as the "substrate" for the metalens and the substrate 1450 is omitted or acts as a protective or stabilizing window or covering.

In the various embodiments described herein, the passive pillars 1330 modify the optical radiation 1395 to have a modified transmission profile. The optical radiation from the LED 1380 is modified by the passive pillars 1330 before passing through the substrate 1350. Using the same calculations used in conjunction with FIGS. 12B and 12C, a gap of 50 microns allows for an inverted metasurface radius value, $r_M$, of 0.38 mm to interact with light at a maximum 70° angle of divergence (1.5 times the radius of the LED), or 0.82 mm for an 85° angle of divergence (3.3 times the radius of the LED).

FIG. 14B illustrates a two-dimensional array 1475 of LEDs with matched-aperture inverted metalenses, according to one embodiment. As compared to FIG. 1B, and even as compared to FIG. 13B, the use of an inverted metalens with a gapless mounting directly on the planar surface of the LED allows for a much higher fill factor of the metalenses with respect to the LEDs. The density of the LEDs, pitch spacing, or fill factor is not limited by the metalens and is instead determined by the size of the LEDs, the LED manufacturing process, any associated co-planar wiring (if any), and/or associated co-planar heat sinks (if any).

Figures 15A, 15B:
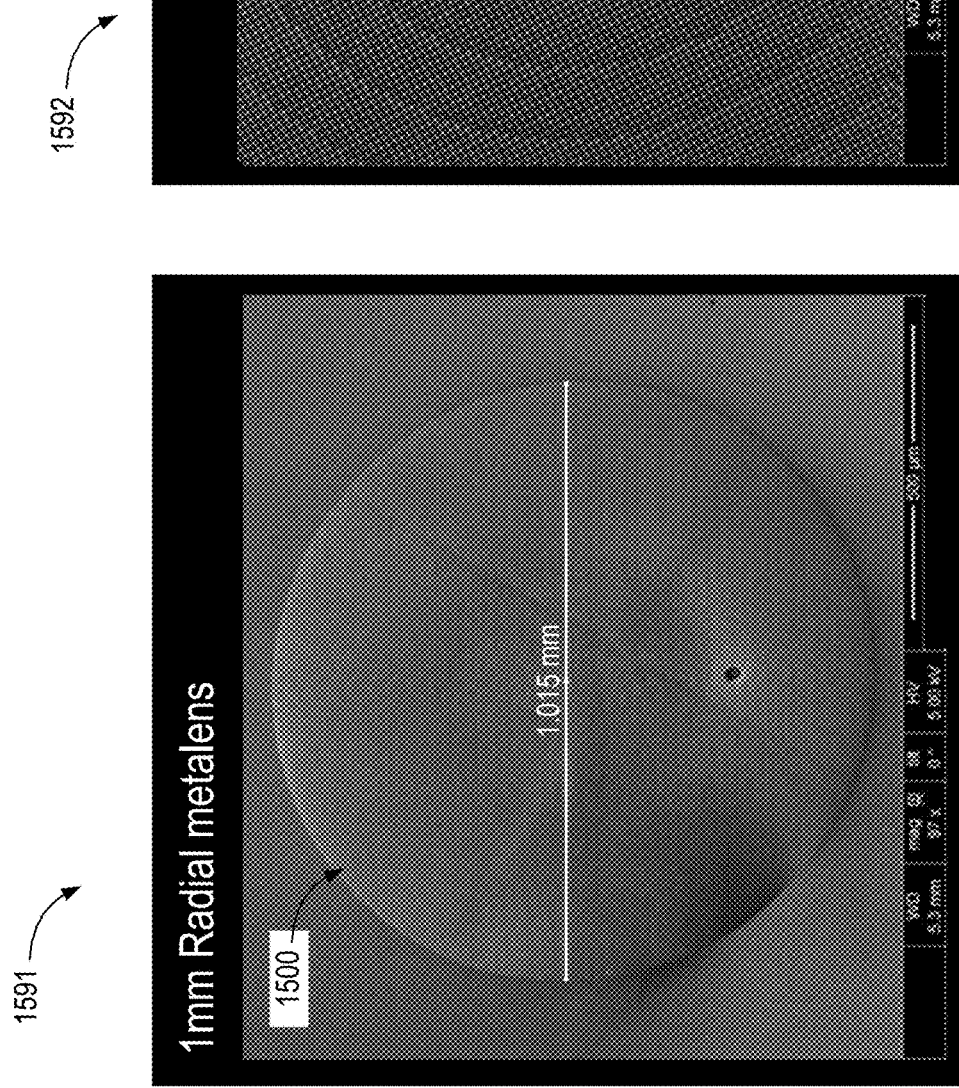
FIGS. 15A-D illustrate images of the arrays of pillars forming a metalens captured using an electronic microscope at varying levels of magnification, according to various embodiments.

FIGS. 15A-D illustrate images of the arrays of pillars forming a metalens captured using an electronic microscope at varying levels of magnification, according to various embodiments. FIG. 15A illustrates an image 1591 of an example metalens 1500 with a radially symmetric pattern of deflector elements (passive pillars). The diameter of the metalens 1500 is approximately 1 millimeter. The illustrated metalens 1500 is circular in shape. In alternative embodiments, the metalens may be rectangular, square, a hexagon, or another shape, as described herein.

FIG. 15B illustrates an image 1592 of the metalens 1500 magnified approximately 50× more than the image 1591 in FIG. 15A to show the radially symmetric pattern of the varying diameters of the passive pillars forming the metasurface of the metalens. As described herein, the passive pillars forming the metasurface may be manufactured on a substrate of the metalens.

Figure 15D:
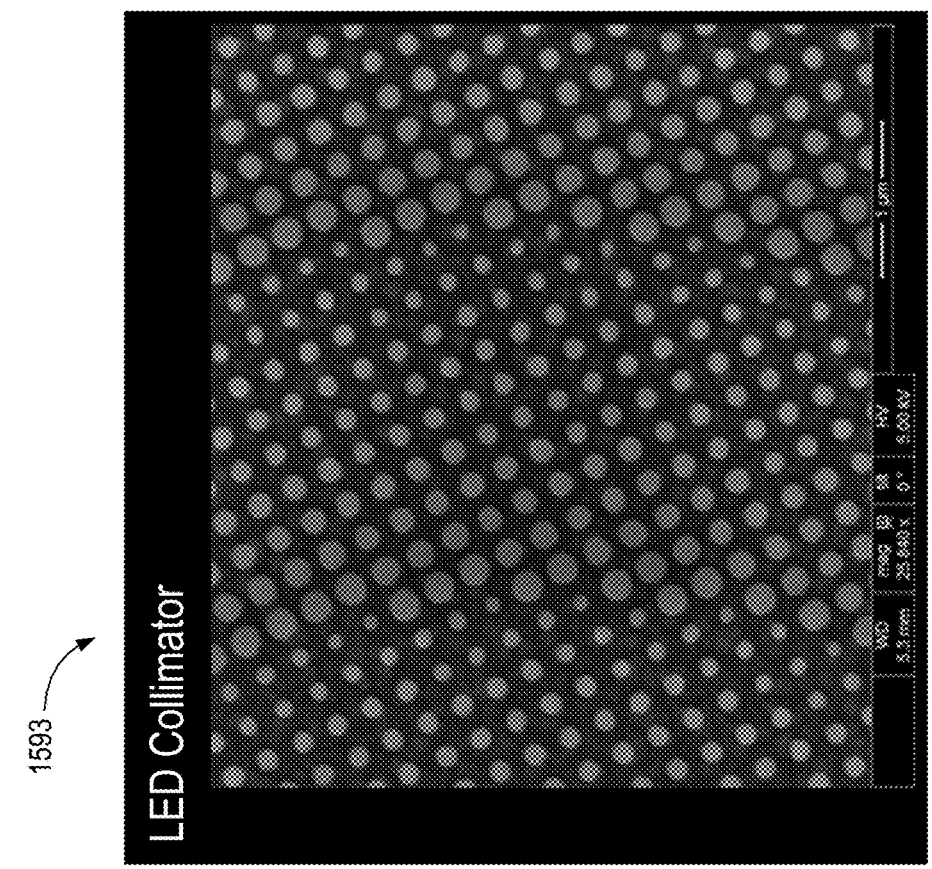
Figure 15C:
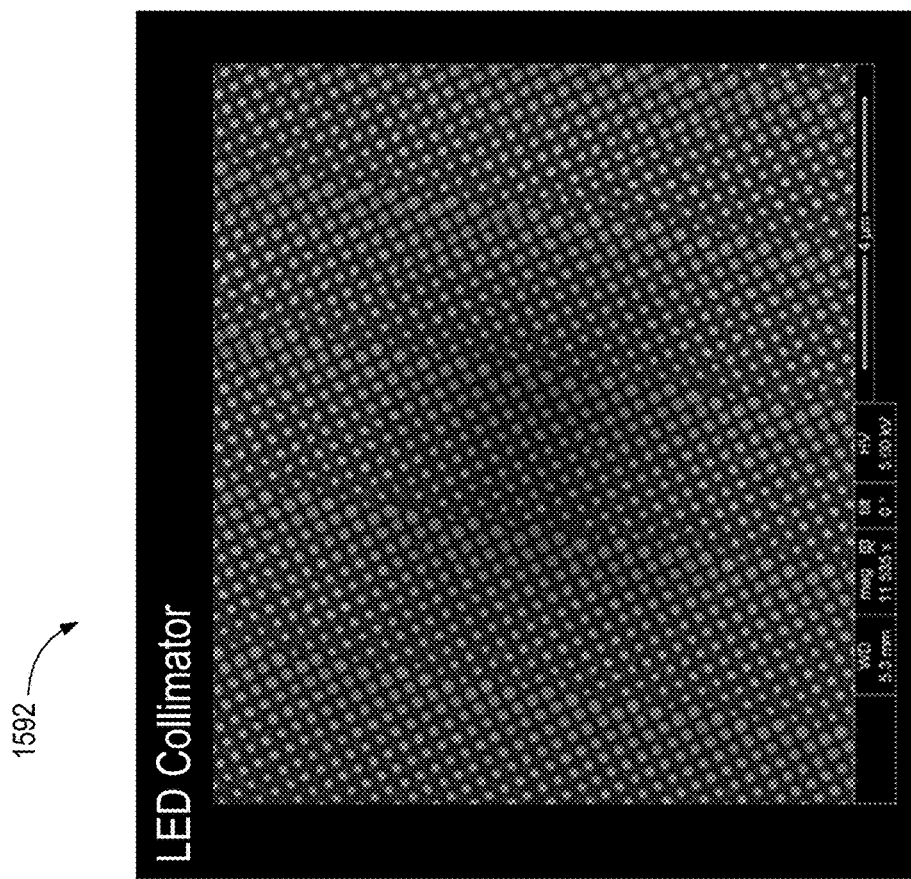

FIG. 15C illustrates an image 1592 of the metalens 1500 magnified an additional 2.5× to show the varying diameters of the individual passive pillars arranged in repeating patterns of increasing diameters in an overall radially symmetric pattern.

FIG. 15D illustrates an image 1593 of a small section of the metalens 1500 magnified an addition 4× to show the circular tops of the passive pillars and their varying diameters. As illustrated, a uniform subwavelength interelement spacing is used between adjacent pillars in the radially symmetric pattern. The passive pillars are illustrated as having a circular cross-section, such that the passive pillars can be described as cylinders that extend from the substrate. In alternative embodiments, the passive pillars may have oval cross sections, rectangular (e.g., square) cross sections, hexagonal cross sections, or other irregular or N-sided polygonal cross sections. The illustrated example shows the diameters of the passive pillars increasing from smallest to largest in a repeating radial pattern from the center to the edge of the metalens 1500. It is appreciated that for the metasurface to form a target phase gradient to modify a divergent emission profile of input optical radiation to have a modified transmission profile, the specific diameters and the radially repeated patterns of diameters may be varied and modified from the illustrated example. Thus, the pattern of passive pillar diameters may not be uniform from smallest to largest, as illustrated in the example metalens 1500 in image 1593.

In some embodiments, the nanopillars (also referred to herein as simply "pillars" or "passive pillars") may be arranged in rows and columns, concentric rings, radially but without overall radial symmetry, and/or in other patterns to achieve a target phase gradient. In various embodiments, the metalens is polarization-independent as the passive pillars are themselves polarization-independent.

This disclosure has been made with reference to various embodiments, including the best mode. However, those skilled in the art will recognize that changes and modifications may be made to the various embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure as encompassed by the claims below, which form a part of this disclosure.

What is claimed is:

1. An optical device, comprising:
    a light-emitting diode (LED) to generate optical radiation at an operational wavelength with a Lambertian emission profile relative to a planar face thereof; and
    a metalens positioned to modify the Lambertian emission profile of the optical radiation from the LED to have a modified transmission profile, the metalens comprising:
    a substrate, and
    a two-dimensional array of passive pillars that extend from the substrate with varying pillar diameters,
    wherein a diameter of each pillar and a subwavelength interelement spacing between adjacent pillars are selected functions of the operational wavelength to provide a target phase gradient that modifies a divergent emission profile of the optical radiation from the LED to have the modified transmission profile, and
    wherein the LED is configured to generate the optical radiation with a Lambertian emission profile relative to the planar face.

2. The device of claim 1, wherein the diameters and interelement spacing of the two-dimensional array of passive pillars are selected to condense the optical radiation from the LED.

3. The device of claim 1, wherein each of the passive pillars comprises at least one of: polysilicon, titanium dioxide, silicon nitride, amorphous silicon, silicon rich nitride, hydrogenated silicon rich silicon nitride, and hydrogenated amorphous silicon (a-H-Silicon).

4. The device of claim 1, wherein the passive pillars extend from the substrate with a non-periodic distribution of pillars having varying diameters.

5. The device of claim 1, further comprising a window layer on the planar face of the LED positioned between the LED and the metalens.

6. The device of claim 5, wherein the metalens is mounted directly to the window layer.

7. The device of claim 6, wherein the substrate of the metalens is mounted directly to the window layer, such that the passive pillars extend from the substrate away from the LED, and
    wherein a radius of the metalens corresponds to a radius of the planar face of the LED, scaled larger as a function of a thickness of the window layer and the thickness of the substrate.

8. The device of claim 6, wherein the metalens is mounted inverted with the passive pillars between the substrate and the window layer, such that the passive pillars extend from the substrate toward the LED, and
    wherein a radius of the metalens corresponds to the radius of the planar face of the LED, scaled as a function of a thickness of the window layer.

9. The device of claim 5, wherein the metalens is positioned with a spacing distance between the metalens and the window layer, and wherein a radius of the metalens is selected as a function of a thickness of the window layer and the spacing distance between the metalens and the window layer.

10. The device of claim 9, wherein the planar face of the LED is square with a radius of approximately 0.25 millimeters, wherein the metalens is square with a radius of approximately 2 millimeters and a thickness less than 1 millimeter, and wherein the spacing distance between the metalens and the window layer is approximately 350 micrometers.

11. The device of claim 1, wherein the passive pillars extend from the substrate with a radially symmetric pattern of varying pillar diameters.

12. The device of claim 1, wherein the metalens is mounted inverted with the passive pillars between the substrate and the planar face of the LED, such that the passive pillars extend from the substrate toward the planar face of the LED.

13. An optical device, comprising:
    a light-emitting diode (LED) to generate optical radiation at an operational wavelength with a Lambertian emission profile relative to a planar face thereof; and
    a metalens positioned to modify the Lambertian emission profile of the optical radiation from the LED to have a modified transmission profile, the metalens comprising:
    a substrate, and
    a two-dimensional array of passive pillars that extend from the substrate with varying pillar diameters,
    wherein a diameter of each pillar and a subwavelength interelement spacing between adjacent pillars are selected as functions of the operational wavelength to provide a target phase gradient that modifies a divergent emission profile of the optical radiation from the LED to have the modified transmission profile, wherein the passive pillars extend from the substrate with a radially symmetric pattern of varying pillar diameters.

14. The device of claim 13, wherein the modified transmission profile comprises a collimated transmission profile, and wherein the diameters and interelement spacing of the two-dimensional array of passive pillars are selected to collimate the optical radiation from the LED.

15. The device of claim 13, wherein the diameters and interelement spacing of the two-dimensional array of passive pillars are selected to condense the optical radiation from the LED.

16. The device of claim 13, wherein the passive pillars extend from the substrate with a non-periodic distribution of pillars having varying diameters.

17. The device of claim 13, further comprising a window layer on the planar face of the LED positioned between the LED and the metalens,
wherein the metalens is mounted directly to the window layer,
wherein the substrate of the metalens is mounted directly to the window layer, such that the passive pillars extend from the substrate away from the LED, and
wherein a radius of the metalens corresponds to a radius of the planar face of the LED, scaled larger as a function of a thickness of the window layer and the thickness of the substrate.

18. The device of claim 13, further comprising a window layer on the planar face of the LED positioned between the LED and the metalens,
wherein the metalens is mounted directly to the window layer,
wherein the metalens is mounted inverted with the passive pillars between the substrate and the window layer, such that the passive pillars extend from the substrate toward the LED, and
wherein a radius of the metalens corresponds to the radius of the planar face of the LED, scaled as a function of a thickness of the window layer.

19. The device of claim 13, wherein the metalens is mounted inverted with the passive pillars between the substrate and the planar face of the LED, such that the passive pillars extend from the substrate toward the planar face of the LED.

20. An optical device, comprising:
a light-emitting diode (LED) to generate optical radiation at an operational wavelength with a Lambertian emission profile relative to a planar face thereof; and
a metalens positioned to modify the Lambertian emission profile of the optical radiation from the LED to have a modified transmission profile, the metalens comprising:
a substrate, and
a two-dimensional array of passive pillars that extend from the substrate with varying pillar diameters,
wherein a diameter of each pillar and a subwavelength interelement spacing between adjacent pillars are selected functions of the operational wavelength to provide a target phase gradient that modifies a divergent emission profile of the optical radiation from the LED to have the modified transmission profile,
wherein the planar face of the LED is rectangular and wherein the metalens has a rectangular aperture with a thickness of less than 1 millimeter.

21. The device of claim 20, wherein the LED is configured to generate the optical radiation with a Lambertian emission profile relative to the planar face.

22. The device of claim 20, wherein the diameters and interelement spacing of the two-dimensional array of passive pillars are selected to condense the optical radiation from the LED.

23. The device of claim 20, wherein the modified transmission profile comprises a collimated transmission profile, and wherein the diameters and interelement spacing of the two-dimensional array of passive pillars are selected to collimate the optical radiation from the LED.

24. The device of claim 20, wherein the passive pillars extend from the substrate with a non-periodic distribution of pillars having varying diameters.

25. The device of claim 20, wherein the passive pillars extend from the substrate with a radially symmetric pattern of varying pillar diameters.

26. The device of claim 20, further comprising a window layer on the planar face of the LED positioned between the LED and the metalens,
wherein the metalens is mounted directly to the window layer,
wherein the substrate of the metalens is mounted directly to the window layer, such that the passive pillars extend from the substrate away from the LED, and
wherein a radius of the metalens corresponds to a radius of the planar face of the LED, scaled larger as a function of a thickness of the window layer and the thickness of the substrate.

27. The device of claim 20, further comprising a window layer on the planar face of the LED positioned between the LED and the metalens,
wherein the metalens is mounted directly to the window layer,
wherein the metalens is mounted inverted with the passive pillars between the substrate and the window layer, such that the passive pillars extend from the substrate toward the LED, and
wherein a radius of the metalens corresponds to the radius of the planar face of the LED, scaled as a function of a thickness of the window layer.

28. The device of claim 20, wherein the metalens is mounted inverted with the passive pillars between the substrate and the planar face of the LED, such that the passive pillars extend from the substrate toward the planar face of the LED.

29. The device of claim 20, wherein the metalens is mounted inverted with the passive pillars between the substrate and the planar face of the LED, such that the passive pillars extend from the substrate toward the planar face of the LED.

30. An optical device, comprising:
a light-emitting diode (LED) to generate optical radiation at an operational wavelength with a Lambertian emission profile relative to a planar face thereof; and
a metalens positioned to modify the Lambertian emission profile of the optical radiation from the LED to have a modified transmission profile, the metalens comprising:
a substrate, and
a two-dimensional array of passive pillars that extend from the substrate with varying pillar diameters,
wherein a diameter of each pillar and a subwavelength interelement spacing between adjacent pillars are selected as functions of the operational wavelength to provide a target phase gradient that modifies a divergent emission profile of the optical radiation from the LED to have the modified transmission profile, wherein the metalens is mounted inverted with the passive pillars between the substrate and the planar face of the LED, such that the passive pillars extend from the substrate toward the planar face of the LED with a gap of less than 50 micrometers, wherein a radius of the metalens is equal to or greater than a radius of the planar face of the LED, and wherein a thickness of the substrate is less than 1 millimeter.

31. The device of claim 30, wherein the planar face of the LED is square, and wherein the metalens is square.

32. The device of claim 30, wherein the LED is configured to generate the optical radiation with a Lambertian emission profile relative to the planar face.

33. The device of claim 30, wherein the diameters and interelement spacing of the two-dimensional array of passive pillars are selected to condense the optical radiation from the LED.

34. The device of claim 30, wherein the modified transmission profile comprises a collimated transmission profile, and wherein the diameters and interelement spacing of the two-dimensional array of passive pillars are selected to collimate the optical radiation from the LED.

35. The device of claim 30, wherein the passive pillars extend from the substrate with a non-periodic distribution of pillars having varying diameters.

36. The device of claim 30, wherein the passive pillars extend from the substrate with a radially symmetric pattern of varying pillar diameters.

37. An optical system, comprising:
a two-dimensional array of light-emitting diodes (LEDs), wherein each LED is configured to emit optical radiation at an operational wavelength with a divergent emission profile relative to a planar face thereof; and a two-dimensional array of metalenses positioned as a layer to receive optical radiation from the two-dimensional array of LEDs, wherein each metalens is positioned relative to one of the LEDs to modify the divergent emission profile of the emitted optical radiation to have a modified transmission profile, wherein each metalens comprises a two-dimensional array of passive pillars that extend from a substrate with a radially symmetric pattern of varying pillar diameters, and wherein a diameter of each pillar and a subwavelength interelement spacing between adjacent pillars are selected as functions of the operational wavelength of an associated LED to provide a target phase gradient that modifies the divergent emission profile of the emitted optical radiation to have the modified transmission profile.

38. The system of claim 37, wherein each LED is configured to generate optical radiation with a Lambertian emission profile.

39. The system of claim 37, wherein the modified transmission profile comprises one of a collimated transmission profile and a condensed transmission profile.

40. The system of claim 37, wherein each of the passive pillars of each metalens is formed from at least one of: titanium dioxide, silicon nitride, amorphous silicon, silicon rich nitride, hydrogenated silicon rich silicon nitride, hydrogenated amorphous silicon (a-H-Silicon), and polysilicon.

41. The system of claim 37, wherein the metalens is mounted inverted with the passive pillars between the substrate and the planar face of the LED.

42. The system of claim 37, wherein each LED comprises a window layer positioned between the planar face and the associated metalens, and wherein the metalens is mounted directly to the window layer.

43. The system of claim 42, wherein the substrate of each metalens is mounted directly to the window layer of a corresponding LED, such that the passive pillars of each respective metalens extend from the substrate away from the associated LED.

44. The system of claim 42, wherein each metalens is mounted inverted with passive pillars between the substrate and the window layer of an associated LED, such that the passive pillars of each respective metalens extend from the substrate toward the associated LED.

45. The system of claim 37, wherein each LED in a first subset of the LEDs is configured to emit optical radiation within a first operational bandwidth and each LED in a second subset of the LEDs are configured to emit optical radiation within a second operational bandwidth.

46. An optical display with integrated inverted metalenses, comprising:
a two-dimensional array of light-emitting diodes (LEDs), wherein each LED comprises:

a planar face to emit optical radiation with a Lambertian emission profile; and an integrated metalens in an inverted configuration with a two-dimensional array of passive pillars that extend between the planar face of the LED and a substrate, wherein the passive pillars are arranged in a radially symmetric pattern of varying pillar diameters, wherein the diameter of each pillar and a subwavelength interelement spacing between adjacent pillars are selected as functions of an operational wavelength of the optical radiation emitted by the LED to provide a target phase gradient that modifies the Lambertian emission profile of the optical radiation generated by the LED to have a modified transmission profile.

47. The optical display of claim 46, wherein the modified transmission profile comprises one of a collimated transmission profile, a condensed transmission profile, and a focused transmission profile with a target focus length.

48. The optical display of claim 46, wherein each of the passive pillars comprises one of: titanium dioxide, silicon nitride, amorphous silicon, silicon rich nitride, hydrogenated silicon rich silicon nitride, hydrogenated amorphous silicon (a-H-Silicon), and polysilicon.

* * * * *